US008294457B2

(12) United States Patent
Schrubbe et al.

(10) Patent No.: US 8,294,457 B2
(45) Date of Patent: Oct. 23, 2012

(54) ROTARY MAGNETIC ENCODER ASSEMBLY, CHIP AND METHOD

(75) Inventors: Carl D. Schrubbe, Waukesha, WI (US); David P. Engsberg, New Berlin, WI (US)

(73) Assignee: Joral LLC, Waukesha, WI (US)

( * ) Notice: Subject to any disclaimer, the term of this patent is extended or adjusted under 35 U.S.C. 154(b) by 1037 days.

(21) Appl. No.: 12/205,902

(22) Filed: Sep. 7, 2008

(65) Prior Publication Data

US 2009/0072816 A1    Mar. 19, 2009

Related U.S. Application Data

(60) Provisional application No. 60/970,865, filed on Sep. 7, 2007, provisional application No. 61/049,382, filed on Apr. 30, 2008.

(51) Int. Cl.
*G01B 7/30* (2006.01)

(52) U.S. Cl. .................. 324/207.25; 324/207.2

(58) Field of Classification Search ............. 324/207.25, 324/207.2, 251
See application file for complete search history.

(56) References Cited

U.S. PATENT DOCUMENTS

| | | |
|---|---|---|
| 2,352,830 A | 7/1944 | Ford |
| 2,548,581 A | 4/1951 | Bigelow |
| 2,564,676 A | 8/1951 | Crouse |
| 2,768,315 A | 10/1956 | Okabe |
| 2,804,515 A | 8/1957 | Heggen |
| 2,915,606 A | 12/1959 | Knauth |
| 3,405,295 A | 10/1968 | Daley et al. |
| 3,420,184 A | 1/1969 | Englesberg et al. |
| RE27,077 E | 2/1971 | Bear |
| 3,742,160 A | 6/1973 | Murray et al. |
| 3,743,872 A | 7/1973 | Dochterman |
| 3,825,781 A | 7/1974 | Woods |
| 4,199,741 A | 4/1980 | Serrus Paulet |
| 4,214,133 A | 7/1980 | Wolford et al. |
| 4,275,291 A | 6/1981 | Feller |
| 4,349,814 A | 9/1982 | Akehurst |

(Continued)

FOREIGN PATENT DOCUMENTS

DE    2833349    7/1978

OTHER PUBLICATIONS

Vdo Schindling, Machine-Generated Translation of DE2833349, Jul. 29, 1978.*

(Continued)

*Primary Examiner* — Bot Ledynh
(74) *Attorney, Agent, or Firm* — Boyle Fredrickson, S.C.

(57) ABSTRACT

A rotary magnetic encoder assembly that has a freewheeling rotatable exciter magnet onboard that excites a magnetic field sensor region of an encoder chip when magnetic interaction between the exciter magnet and rotating encoder shaft causes the exciter magnet to rotate. In one embodiment, a drive magnet carried by the shaft magnetically couples with the exciter magnet because the medium therebetween has low magnetic permeability enabling rotation substantially in unison with the shaft. The exciter magnet is disposed in an onboard retainer pocket that accurately locates the magnet relative to the sensor region of the encoder chip. In one preferred embodiment, the exciter magnet retainer pocket is disposed onboard the encoder chip, such as by being formed as part of the package body of the chip that can be integrally formed or as part of a module that is mountable on the chip.

41 Claims, 13 Drawing Sheets

U.S. PATENT DOCUMENTS

| | | | |
|---|---|---|---|
| 4,596,971 | A | 6/1986 | Hirabayashi et al. |
| 4,647,733 | A | 3/1987 | Rose |
| 4,752,683 | A | 6/1988 | McGuire |
| 4,942,394 | A | 7/1990 | Gasiunas |
| 5,365,785 | A | 11/1994 | Martin |
| 5,382,792 | A | 1/1995 | Hurst et al. |
| 5,646,523 | A | 7/1997 | Kaiser et al. |
| 5,729,218 | A | 3/1998 | Lepperdinger |
| 5,824,896 | A | 10/1998 | Lee |
| 5,856,743 | A * | 1/1999 | Juniman ................. 324/207.25 |
| 6,098,456 | A | 8/2000 | Munck |
| 6,154,975 | A | 12/2000 | Steinich |
| 6,288,533 | B1 | 9/2001 | Haeberli et al. |
| 6,326,781 | B1 | 12/2001 | Kunde et al. |
| 6,564,632 | B2 | 5/2003 | Ross, Jr. |
| 6,604,434 | B1 | 8/2003 | Hamilton et al. |
| 7,015,688 | B2 | 3/2006 | Wolber et al. |
| 7,155,349 | B1 | 12/2006 | Souluer |
| 7,173,506 | B2 | 2/2007 | Ross, Jr. |
| 2002/0104388 | A1 | 8/2002 | Schrubbe |
| 2004/0246148 | A1 | 12/2004 | Kabashima et al. |
| 2006/0087316 | A1 | 4/2006 | Islam et al. |
| 2007/0151322 | A1 | 7/2007 | Steinich |
| 2007/0152657 | A1 | 7/2007 | Yabe et al. |
| 2008/0180864 | A1 | 7/2008 | Meguro et al. |

OTHER PUBLICATIONS

"AS5030 8 Bit Programmable High Speed Magnetic Rotary Encoder" Data Sheet, Austria Microsystems, Rev. 1.6, 33 pages.

AS5046 Programmable 12-bit 360° Magnetic Angle Encoder With Absolute 2-Wire Serial and Analog Interfaces, Preliminary Data Sheet, Austria Microsystems, Revision 1.0, 33 pages.

"Installation Instructions for ES Series Encoders", BEI Industrial Encoders, Specification No. 924-02105, Rev. Jul. 2007, 3 pages.

"RM36 Series Non-Contact Rotary Encoders" Data Sheet L-9517-9148-05-A, Renishaw Apply Innovation, undated, 8 pages.

* cited by examiner

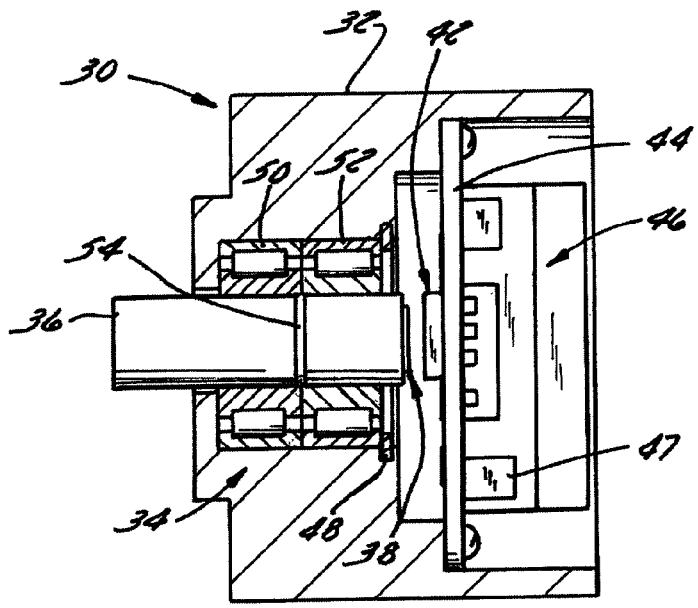
*FIG. 1*
*PRIOR ART*
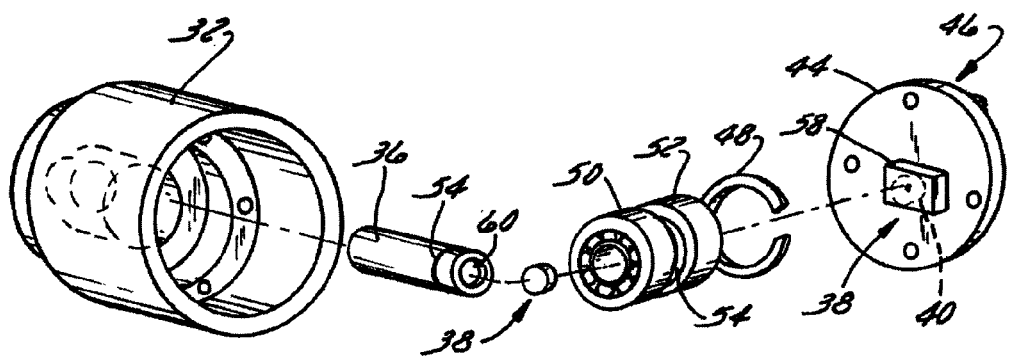
*FIG. 2*
*PRIOR ART*
*FIG. 3*
*PRIOR ART*

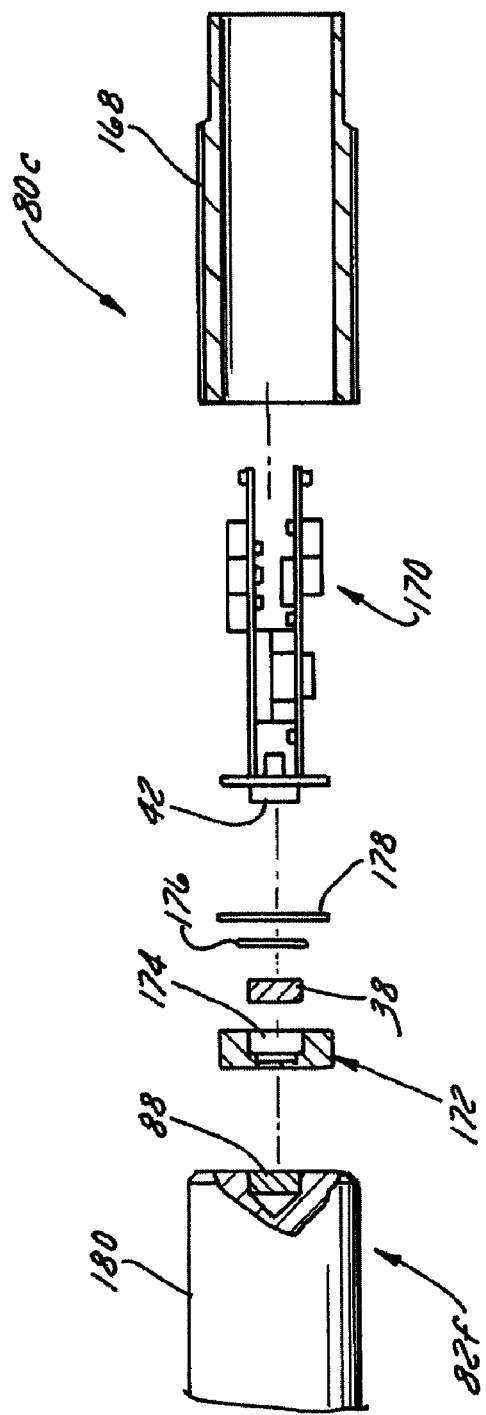

ROTARY MAGNETIC ENCODER ASSEMBLY, CHIP AND METHOD

CROSS-REFERENCE

This application claims the benefit under 35 U.S.C. §119 (e) of U.S. Provisional Application Ser. No. 60/970,865, filed Sep. 7, 2007, and U.S. Provisional Application Ser. No. 61/049,382, filed Apr. 30, 2008, the entirety of both of which are expressly incorporated by reference herein.

FIELD

The present invention relates to an improved rotary magnetic encoder assembly, magnetic encoder integrated circuit therefor as well as a related method of use or operation.

BACKGROUND

Rotary encoders of optical or magnetic construction are used to measure or sense rotation, typically of a shaft or the like, by providing rotational-related data from which information, such as absolute or relative rotary position can be determined. Rotary encoders are very versatile and used in applications that frequently require controlling the motion of a rotating object, such as a shaft or the like. Other applications include: monitoring motor feedback, cut-to-length applications, filling applications, backstop applications, robotics, etc.

Optical rotary encoders typically use a circular disk that has sections coded, such as by being blacked out or otherwise marked, that turns with the object whose rotary movement is being measured. A sensor reads light reflected from the disk in determining whether there has been a change in rotary position of the disk.

While optical rotary encoders have enjoyed a great deal of commercial success, they nonetheless suffer from numerous drawbacks. They are undesirably complicated, sensitive to dust, oil and dirt, mechanically fragile, typically cannot be used in relatively high temperature environments, and are susceptible to shock and vibration.

Magnetic rotary encoders have a construction that overcomes most, if not nearly all, of these disadvantages. However, in the past, magnetic rotary encoders require relatively precise axial and radial positioning of an encoder shaft-mounted magnet used to excite Hall Effect sensors that define a sensor region of a magnetic rotary encoder chip. Since the Hall sensors inside the encoder chip require a uniform magnetic field distribution, failure to maintain such precise exciter magnet location produces increased signal noise, causes positional error, or both, which obviously is highly undesirable.

What is therefore needed is a rotary magnetic encoder that does not suffer the drawbacks of rotary optical encoders but is more tolerant to encoder shaft misalignment than conventional rotary magnetic encoders.

SUMMARY

The present invention is directed to at least one of a rotary magnetic encoder assembly, rotary magnetic encoder chip therefor as well as a method of use and operation thereof. A rotary magnetic encoder chip having a magnetic field sensor arranged defined by at least a plurality of Hall sensors arranged in an array that defines a sensor region experiences a magnetic field of a rotatable exciter magnet retained in a magnet retainer that locates the exciter magnet relative to the Hall sensors to help ensure consistent and accurate operation even where there is significant encoder shaft misalignment, mislocation or both. The encoder shaft effects rotation of the rotatable exciter magnet without contacting the exciter magnet. The retainer is an exciter-magnet holding pocket that is disposed onboard the rotary magnetic encoder assembly and which can be disposed on or onboard the rotary magnetic encoder chip.

A rotary magnetic encoder assembly constructed in accordance with the present invention includes an encoder body and/or housing that carries either an encoder chip having a rotatable exciter magnet retainer and rotatable exciter magnet or which includes such a retainer carried by the encoder body or housing in a manner that maintains accurate location of the rotatable exciter magnet relative to the sensor region of the encoder chip. In one preferred embodiment, the retainer is a rotatable exciter magnet-holding pocket formed in a portion of the encoder body. In another preferred embodiment, the retainer is a rotatable exciter magnet-holding pocket formed in an insert disposed in engagement with the encoder body and/or encoder housing. Such an insert can also be carried by a carriage that is carried by an encoder housing or otherwise disposed within the housing.

The encoder shaft is a rotary shaft equipped with a drive coupler that causes the exciter magnet to rotate when the shaft rotates without there being physical contact therebetween. Such a drive coupler can include one or more drive magnets disposed at or adjacent the free end of the encoder shaft that magnetically couple with the exciter magnet to cause the exciter magnet to rotate when the encoder shaft rotates. Such a drive coupler can be made of a magnetic material, e.g., ferromagnetic material, located in close enough proximity to the exciter magnet that encoder shaft rotation causes or effects exciter magnet rotation even though there is no physical contact therebetween. Where the encoder shaft is of ferromagnetic construction at or adjacent its free end and carries a drive magnet, the drive coupler is configured so that the drive magnet preferably is magnetically isolated by a non-magnetic material such as bronze, non-magnetic stainless steel or the like.

Such a rotary magnetic encoder assembly has any medium disposed between the exciter magnet and an adjacent free end of the encoder shaft being of relatively low magnetic permeability so that magnetic lines of flux flow substantially without interruption between the exciter magnet and encoder shaft end thereby linking the flux lines enabling rotation of the exciter magnet to be effected by encoder shaft rotation. Where the medium is a solid medium, such as where it includes a portion of the exciter magnet retainer in which a magnet-holding pocket is disposed, it has a relatively low permeability on the order of a non-ferromagnetic material which can be as low as the permeability of a vacuum as this facilitates effecting rotation of the exciter magnet by the encoder shaft by helping to maximize flux linkage. To facilitate freewheeling rotation of the exciter magnet so that it rotates substantially in unison with the encoder shaft relatively shortly after shaft rotation begins, the material from which the magnet holding pocket is formed has a relatively low coefficient of friction.

Any medium disposed between the rotative exciter magnet and sensor arrangement/sensor region can also have relatively low magnetic permeability such that the sensor arrangement/sensor region of the encoder chip experiences a substantially uniform magnetic field from the exciter magnet due to it being accurately axially, radially and angularly located relative thereto by being retained in the pocket of the retainer. The exciter magnet preferably is a permanent magnet of bipolar construction having a center disposed in line with a center of the sensor arrangement/sensor region of the encoder chip due to it being located by being in the pocket of the retainer.

In one preferred encoder chip embodiment, the package body of the chip includes the exciter magnet retainer with its pocket in which the rotatable exciter magnet is disposed being integrally formed. In another preferred embodiment, a layer is disposed on the package body that includes the pocket with the magnet disposed therein. In still another embodiment, the exciter magnet is disposed in a pocket of a module that is attachable to the package body of an encoder chip.

In a method in accordance with the present invention, rotation of the encoder shaft effects rotation of the exciter magnet, whose moving magnetic field interacts with the Hall sensors of the sensor region of the fixed encoder chip causing the chip to output a signal or data indicative of rotary position, rotary angle, rotational speed, or the like. In one preferred embodiment where the encoder shaft includes a drive coupler that includes a drive magnet, rotation of the exciter magnet is caused by magnetic coupling between the drive magnet and exciter magnet. As a result, the encoder shaft no longer must be precisely located using one or more encoder shaft bearings attached to the encoder body or encoder housing, resulting in a rotary magnetic encoder assembly that is bearing-less so as to be of more economical construction and which is advantageously more tolerant of encoder shaft misalignment and mislocation.

DRAWING DESCRIPTION

Preferred exemplary embodiments of the invention are illustrated in the accompanying photographs, in which like reference numerals represent like parts throughout, and in which:

FIG. 1 is a cross sectional view of a prior art rotary magnetic encoder assembly illustrating a bearing arrangement used to precisely position an exciter magnet relative to a rotary magnetic encoder integrated circuit chip to ensure it outputs a good signal;

FIG. 2 is an exploded view of the prior art rotary magnetic encoder assembly of FIG. 1;

Figure 4:
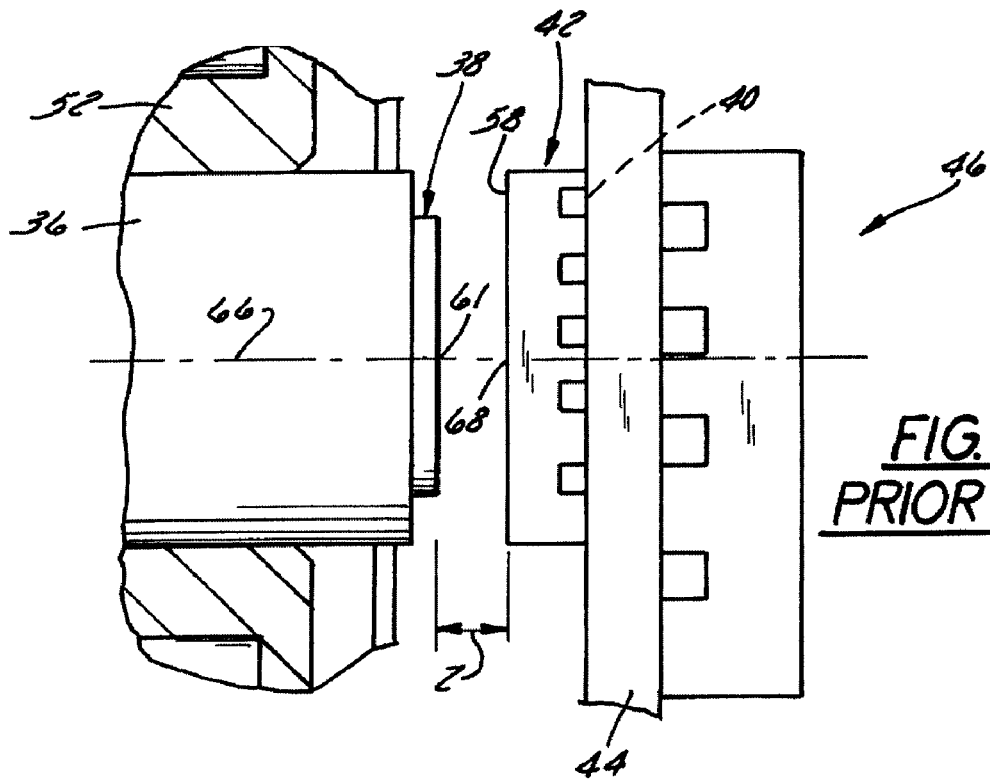
Figure 5:
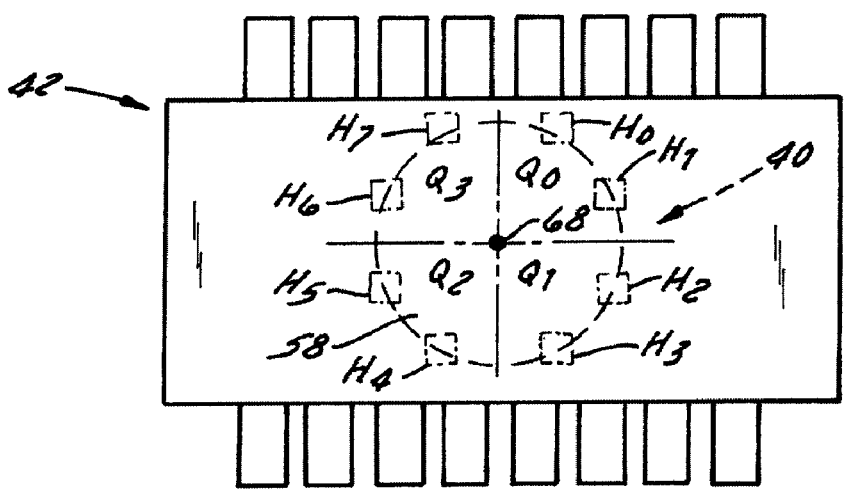
Figure 6:
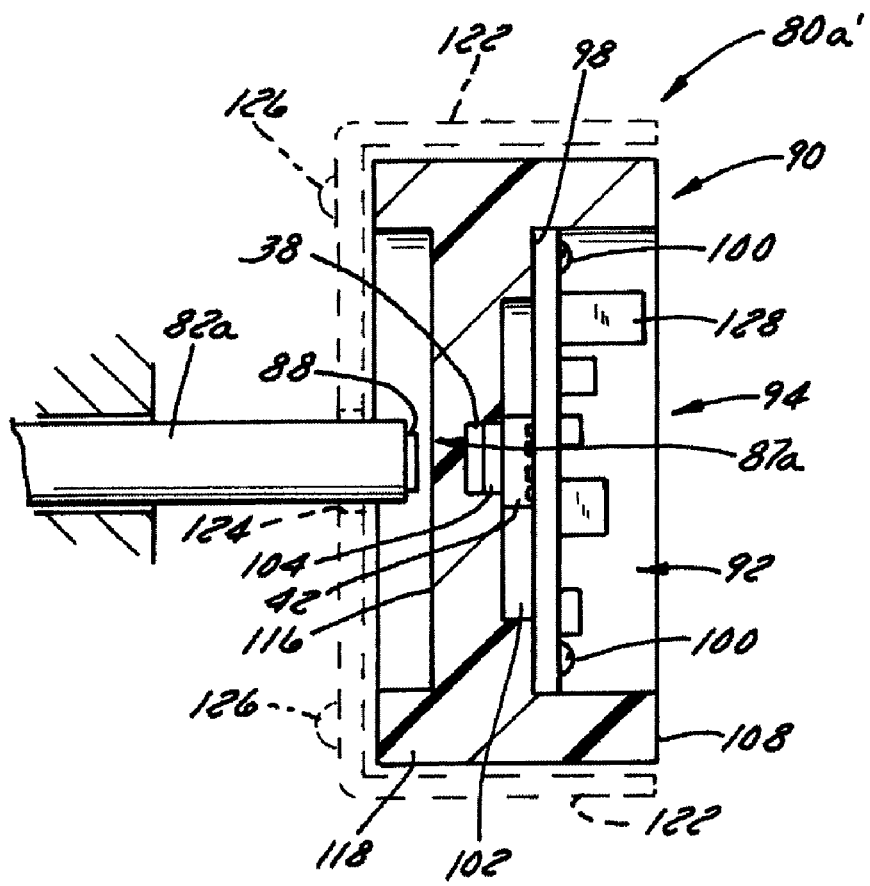
Figure 7:
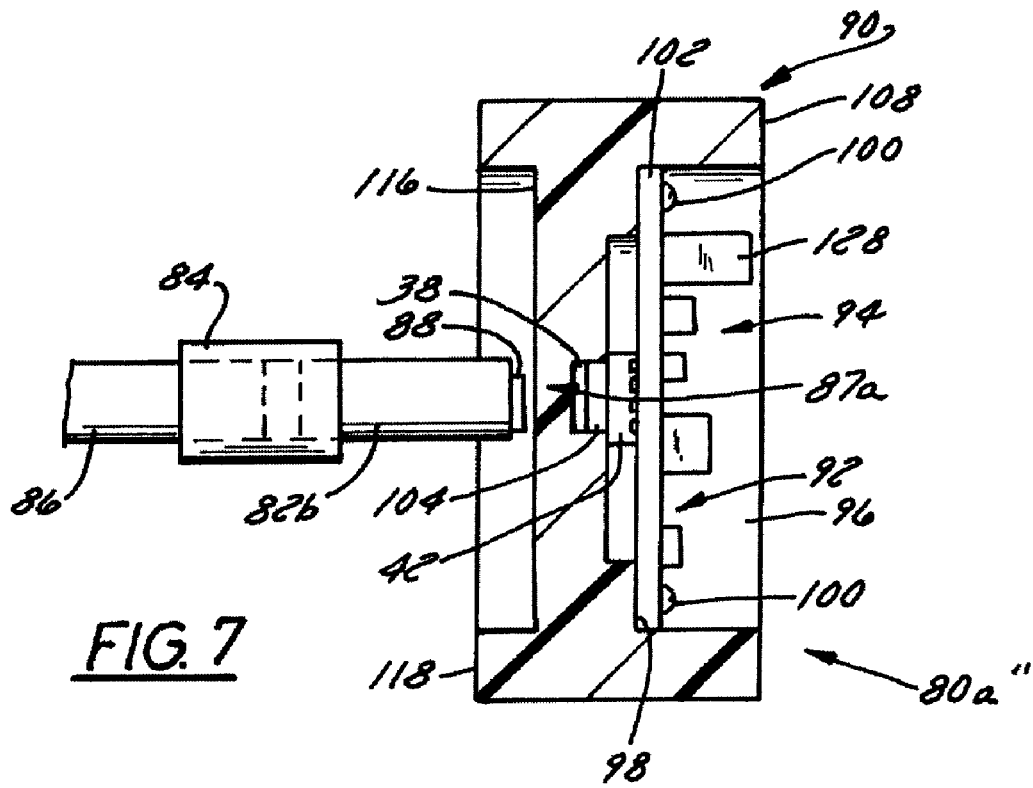
Figure 8:
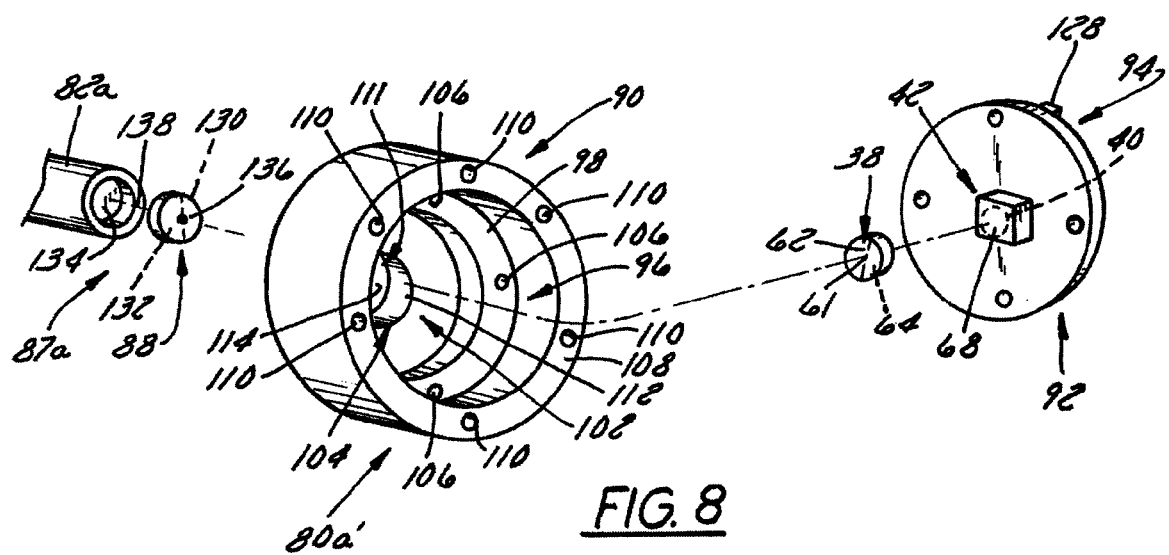
Figure 9:
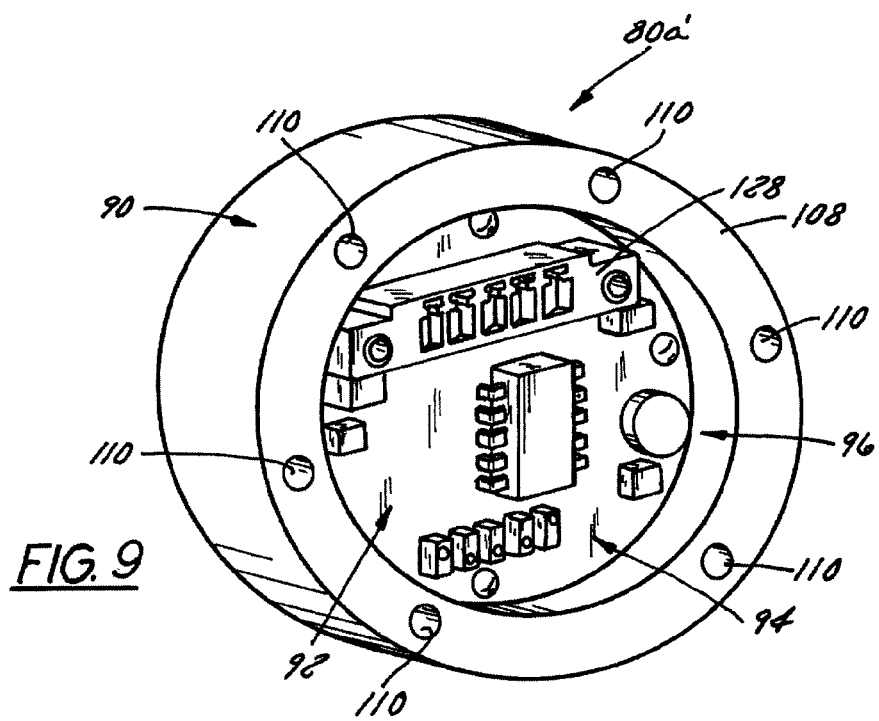
Figure 10:
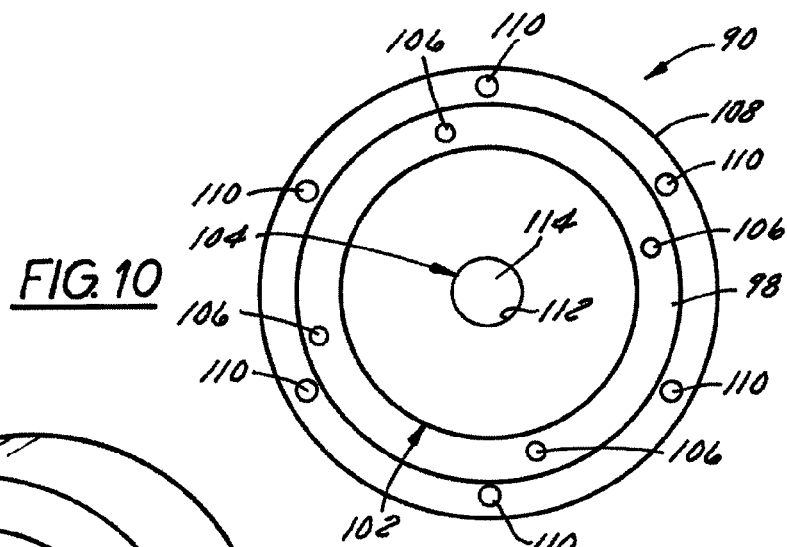
Figure 11:
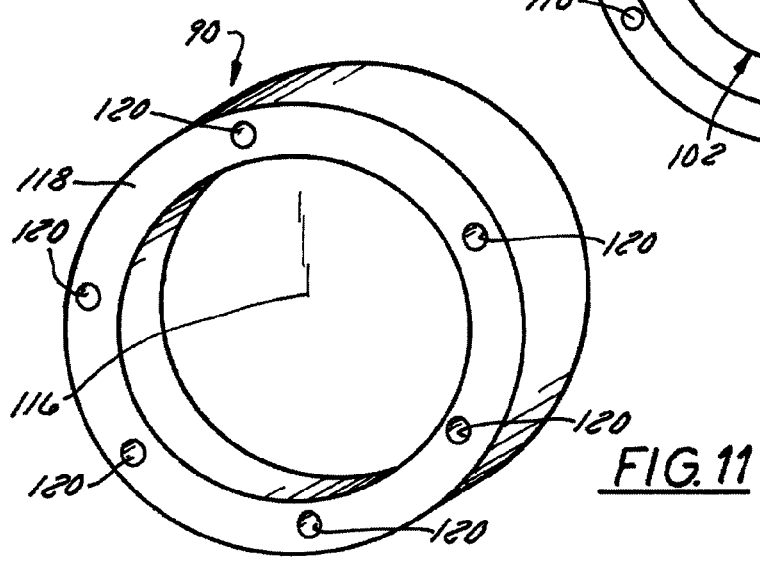
Figure 12:
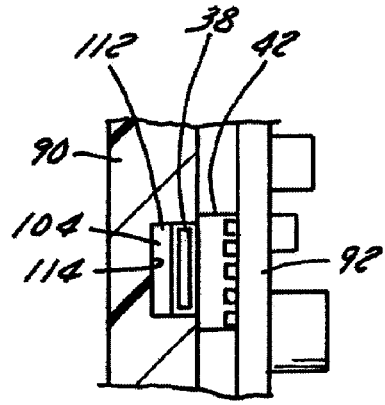
Figure 13:
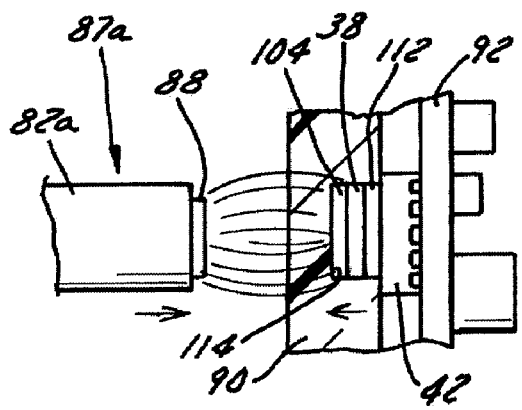
Figure 14:
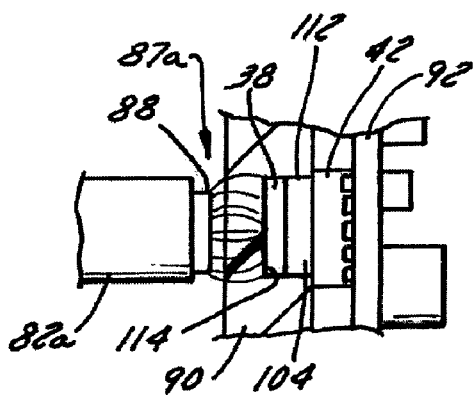
Figure 15:
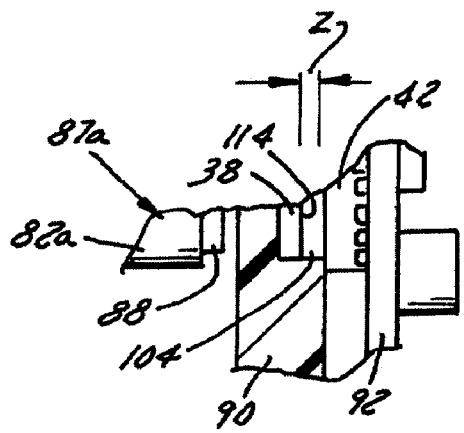
Figure 16:
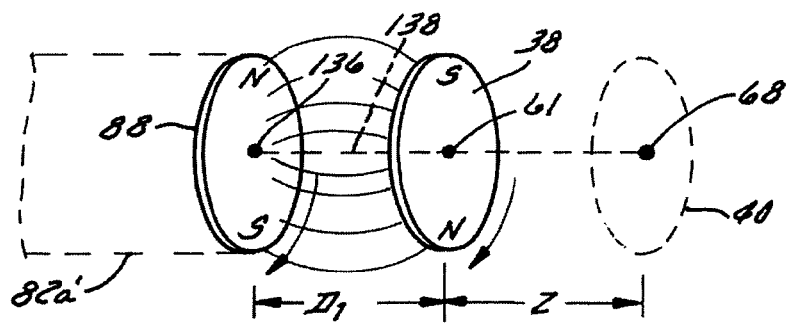
Figure 17:
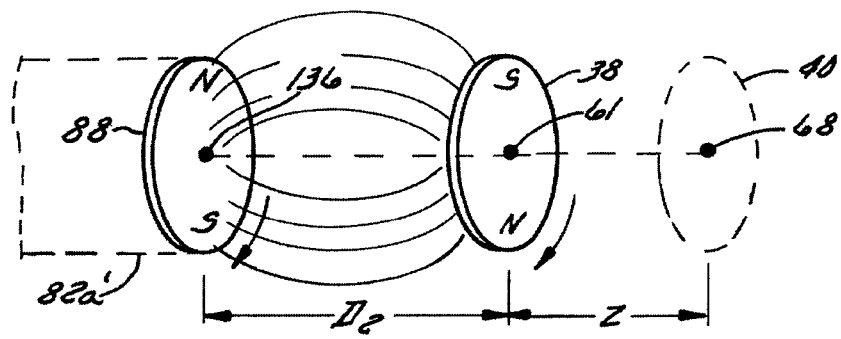
Figure 18:
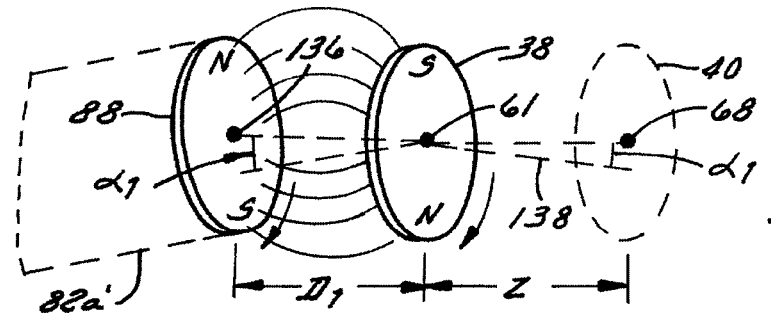
Figure 19:
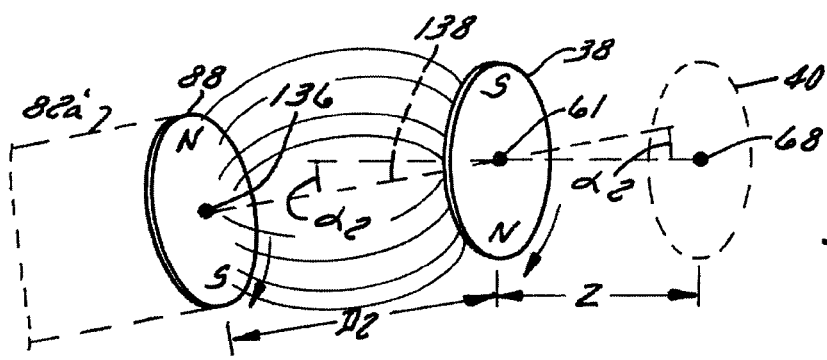
Figure 20:
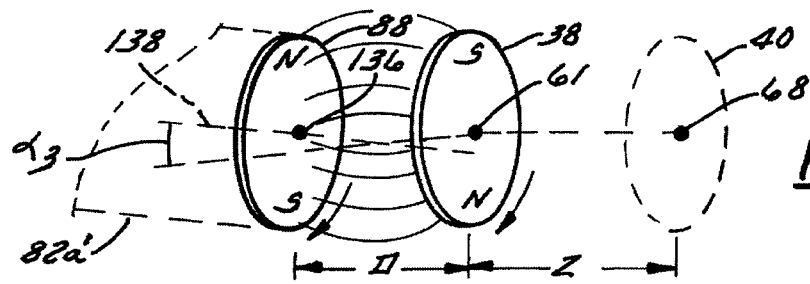
Figure 21:
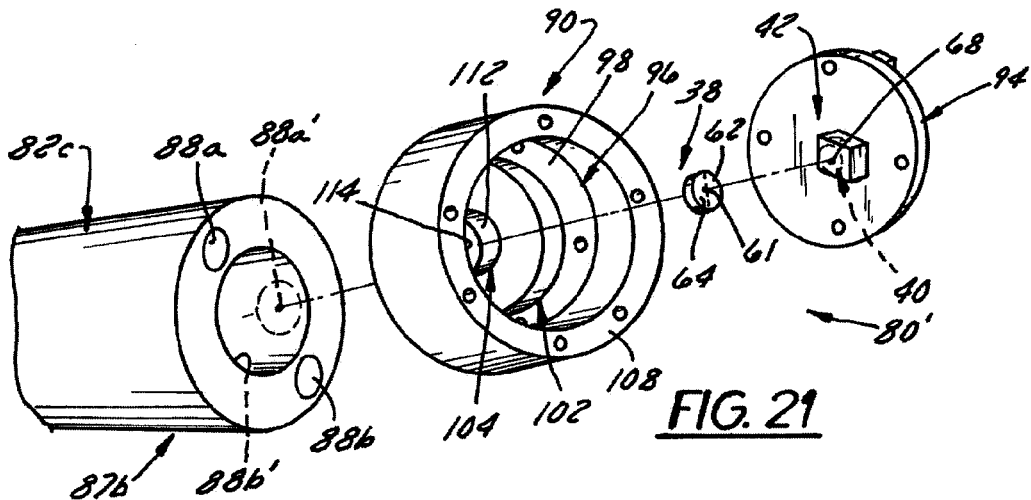
Figure 22:
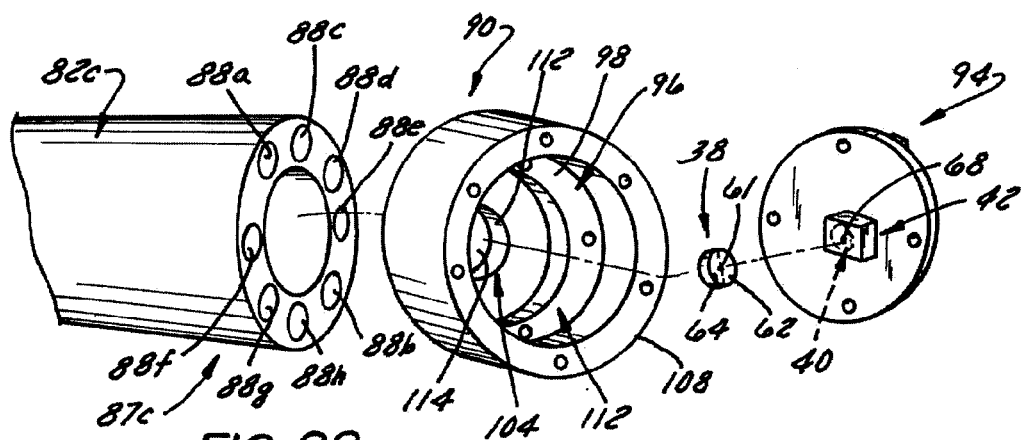
Figure 23:
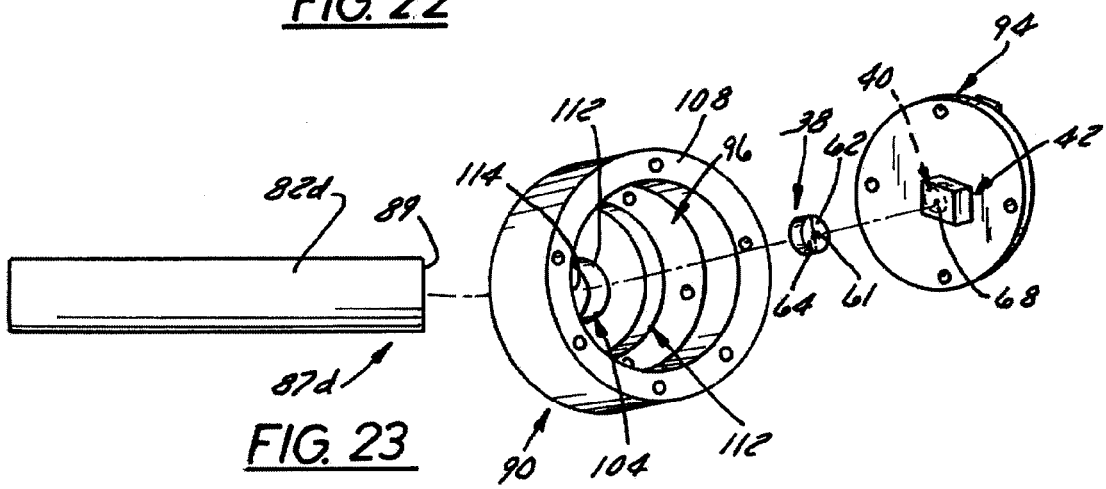
Figure 24:
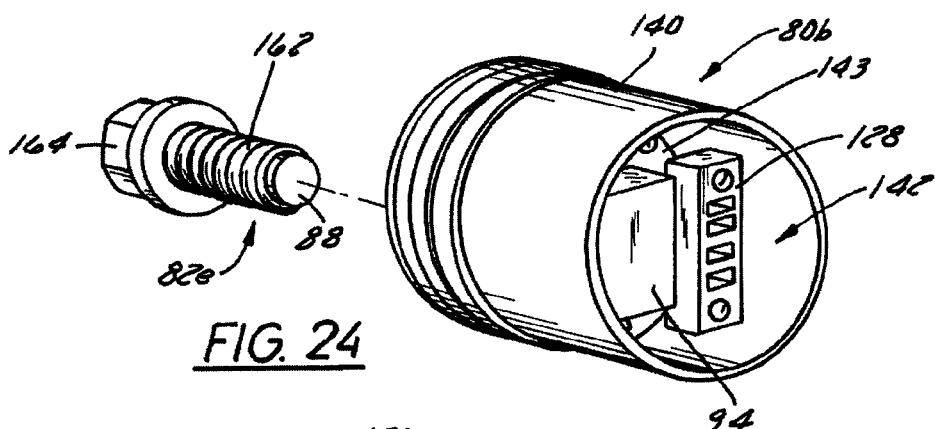
Figure 25:
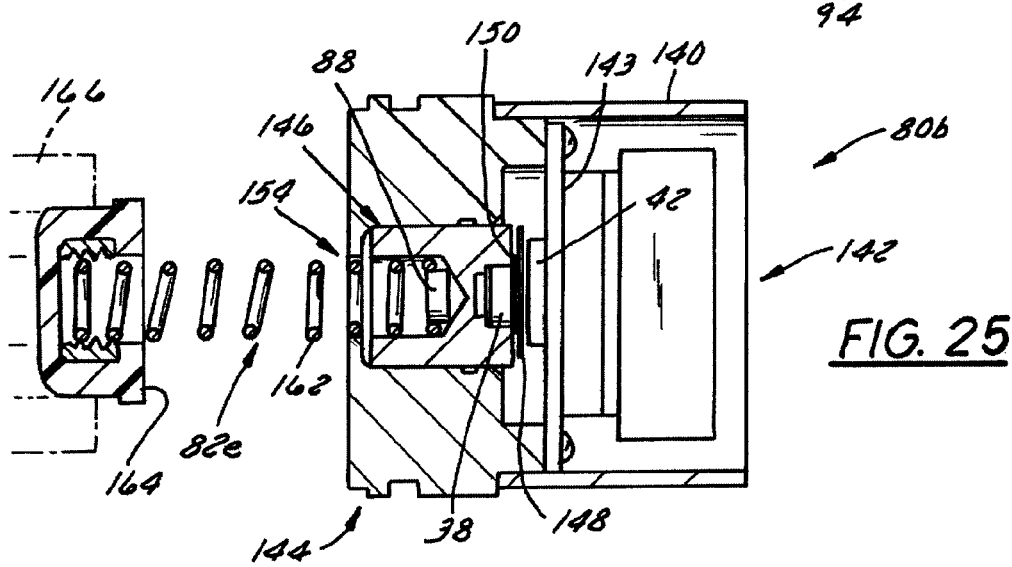
Figure 26:
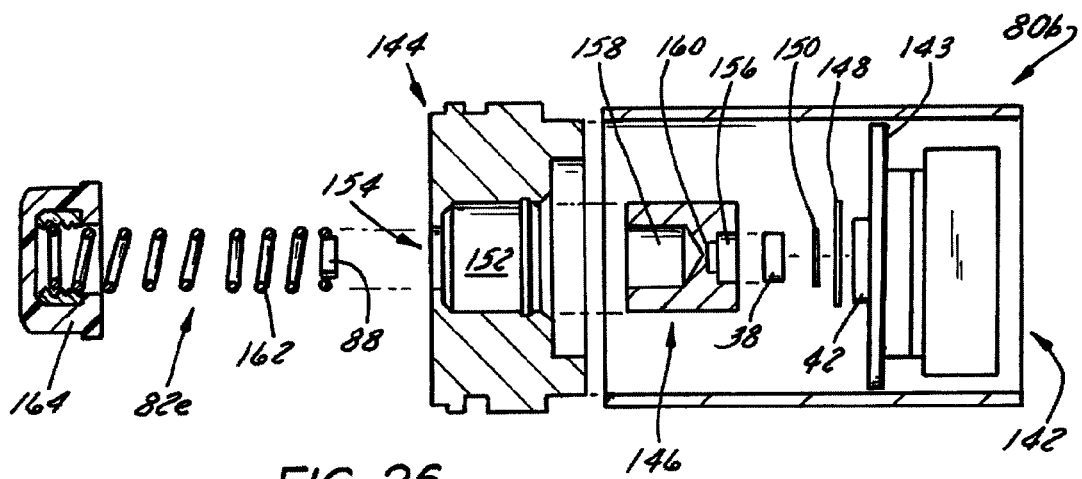
Figure 29:
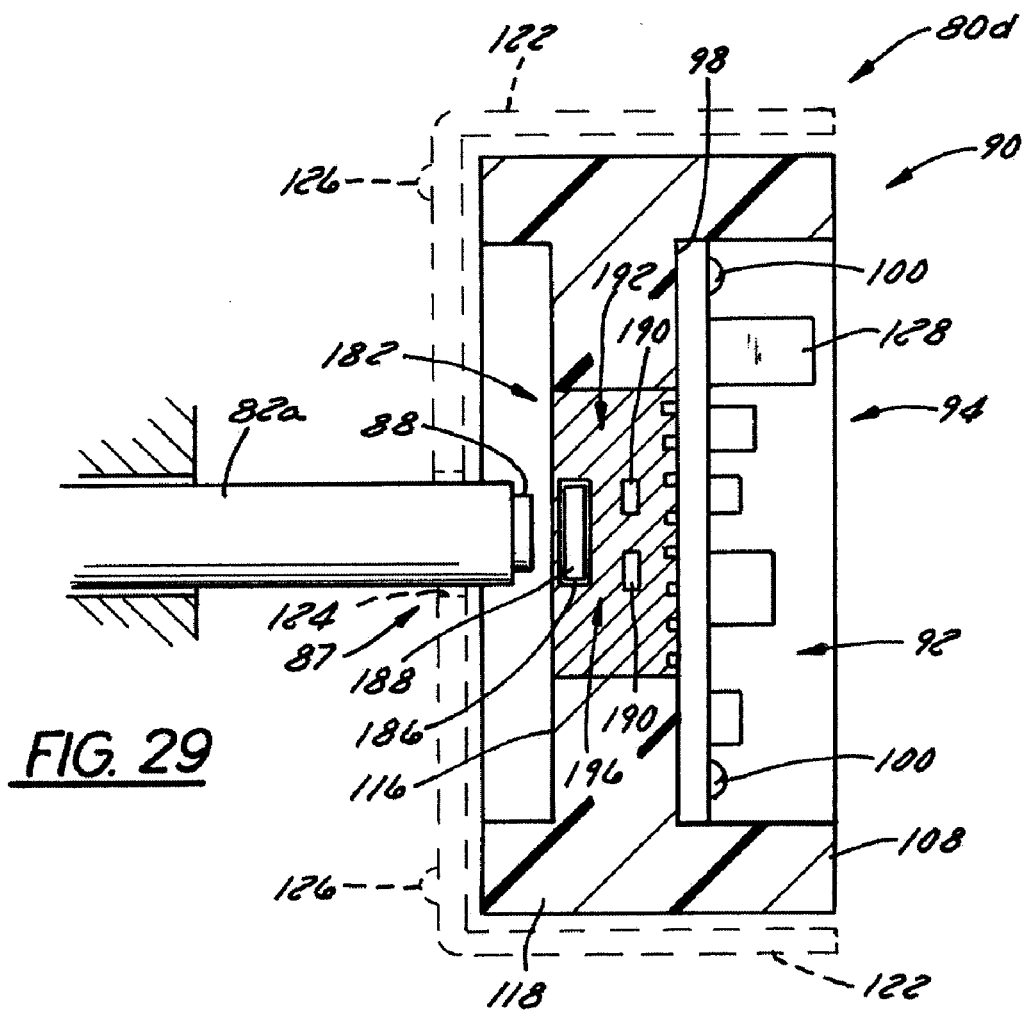
Figure 28:
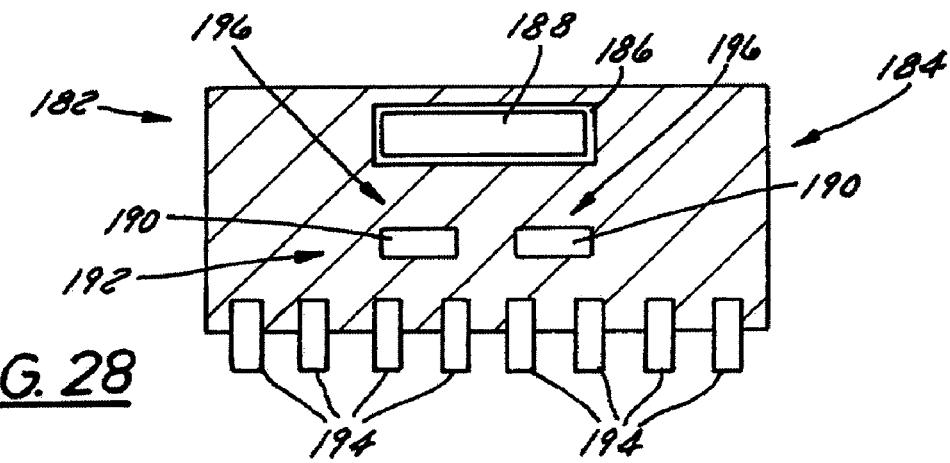
Figure 31:
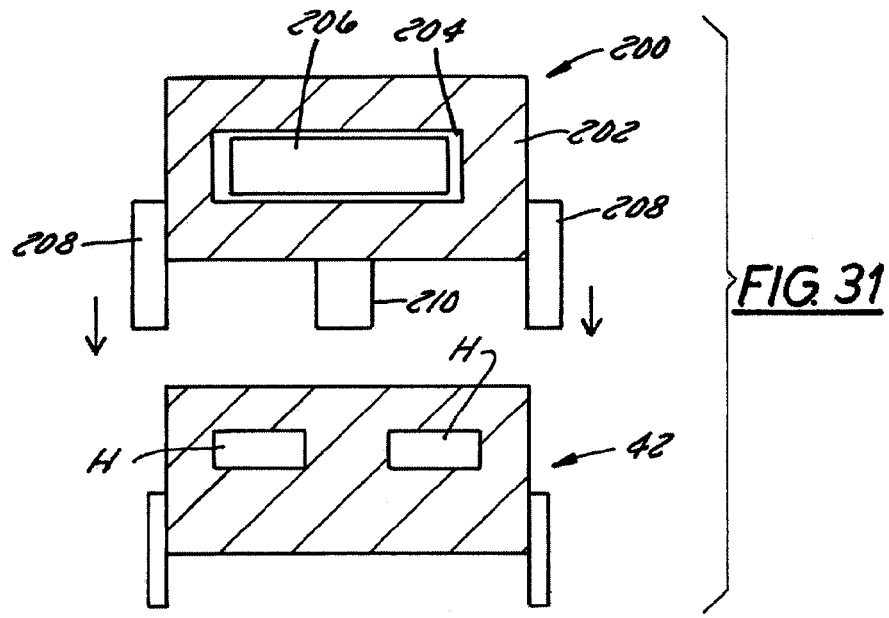
Figure 30:
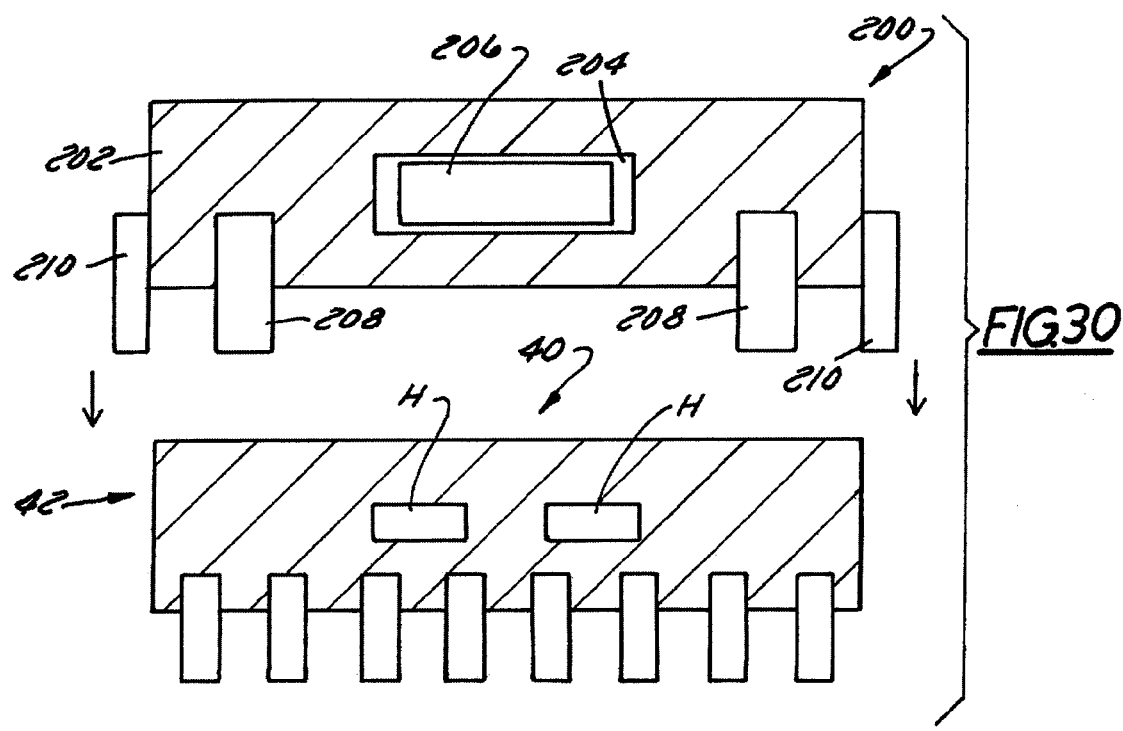
Figure 33:
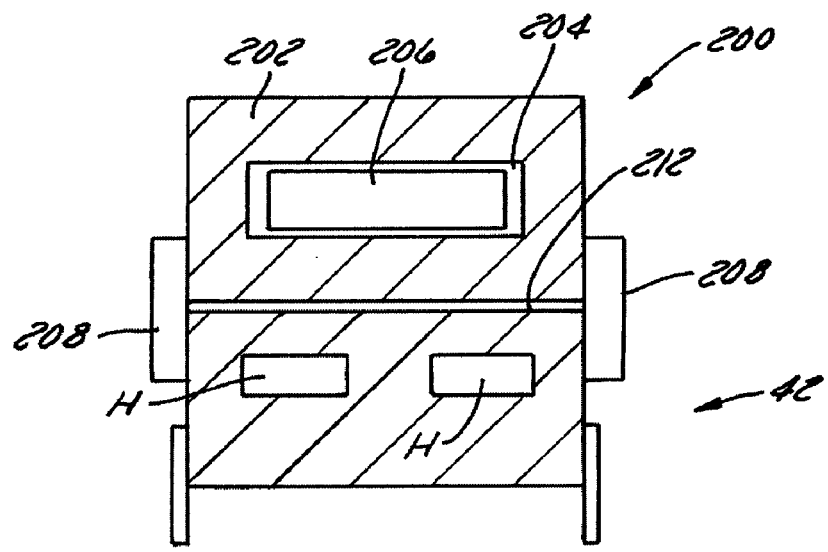
Figure 32:
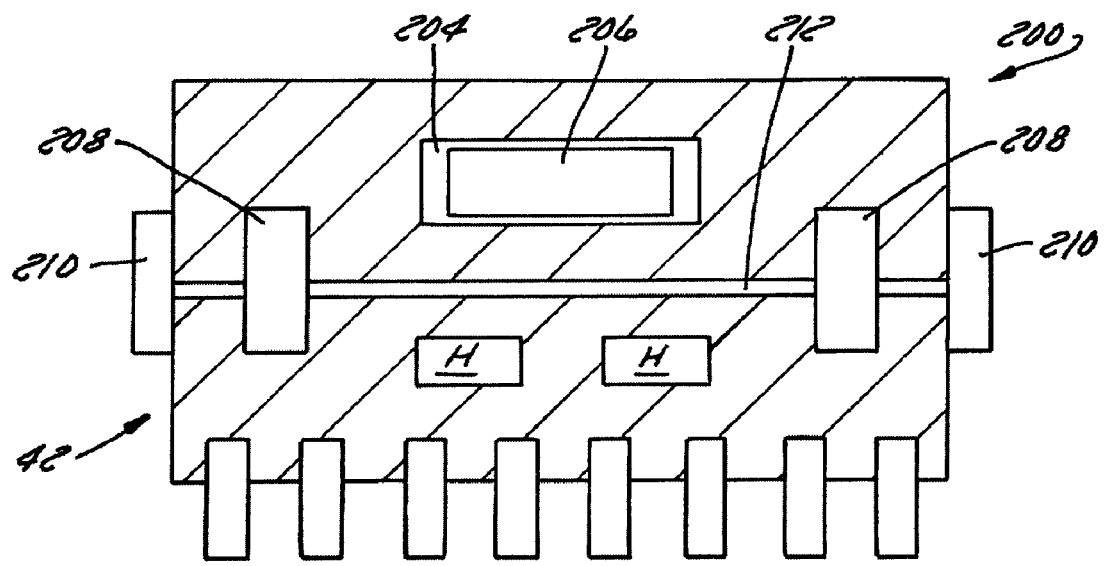

FIG. 3 in an enlarged fragmentary exploded view of an encoder shaft, exciter magnet and rotary magnetic encoder integrated circuit chip of the prior art rotary magnetic encoder assembly of FIG. 1;

FIG. 4 is an enlarged fragmentary cross sectional view of the encoder shaft and exciter magnet precisely located relative to the rotary magnetic encoder integrated circuit chip of the prior art rotary magnetic encoder assembly of FIG. 1;

FIG. 5 is a top plan view of the rotary magnetic encoder integrated circuit chip showing its sensor region comprised of an array of Hall Effect sensors or switches;

FIG. 6 is one variant of a first preferred embodiment of an encoder shaft angular misalignment and mislocation tolerant rotary magnetic encoder assembly constructed in accordance with the present invention;

FIG. 7 is another variant of the first preferred rotary magnetic encoder assembly embodiment where the encoder shaft is connected by a coupling to a drive or driven shaft;

FIG. 8 is an exploded view of the first preferred rotary magnetic encoder assembly embodiment;

FIG. 9 is an enlarged perspective view of the first preferred rotary magnetic encoder assembly embodiment;

FIG. 10 is a front elevation view of a "puck" shaped encoder body of the first preferred rotary magnetic encoder assembly embodiment;

FIG. 11 is a rear elevation view of the "puck" shaped encoder body;

FIG. 12 is an enlarged fragmentary cross sectional view of an exciter magnet held captive in a pocket of the encoder body in an uncoupled state;

FIG. 13 is an enlarged fragmentary cross sectional view of the exciter magnet held captive in a pocket of the encoder body being drawn into coupling with a drive magnet carried by an encoder shaft of the first preferred rotary magnetic encoder assembly embodiment;

FIG. 14 is an enlarged fragmentary cross sectional view of the exciter magnet magnetically coupled with the encoder shaft drive magnet;

FIG. 15 is an enlarged fragmentary cross sectional view of the exciter magnet magnetically coupled with the encoder shaft drive magnet cutaway to show how magnetic coupling also locates the exciter magnet relative to the rotary magnetic encoder integrated circuit chip;

FIG. 16 illustrates a first magnetic coupling case with exemplary flux lines shown where the drive magnet, exciter magnet and sensor region of the rotary magnetic encoder integrated circuit chip are aligned with the drive magnet magnetically coupled with the exciter magnet;

FIG. 17 illustrates a second magnetic coupling case with exemplary flux lines shown where the spacing between the drive magnet and exciter magnet is increased showing spacing tolerance of the first preferred rotary magnetic encoder assembly embodiment;

FIG. 18 illustrates a third magnetic coupling case with exemplary flux lines shown where there is angular misalignment between the drive magnet and exciter magnet while magnetic coupling therebetween is maintained;

FIG. 19 illustrates a fourth magnetic coupling case with exemplary flux lines shown where there is angular misalignment and increased spacing between the drive magnet and exciter magnet while magnetic coupling is maintained;

FIG. 20 illustrates a fifth magnetic coupling case with exemplary flux lines shown where the drive magnet is radially offset and angularly misaligned relative to the exciter magnet while maintaining magnetic coupling therebetween;

FIG. 21 illustrates one preferred drive coupling arrangement where a pair of opposite pole magnets are attached to the encoder shaft and couple with the exciter magnet;

FIG. 22 illustrates another preferred drive coupling arrangement where several drive magnets are used to couple with the exciter magnet;

FIG. 23 illustrates still another preferred drive coupling arrangement where the encoder shaft either includes a magnet with a single pole facing toward the exciter magnet or is made of a magnetically attractive material that is located close enough to the exciter magnet so as to effectively couple with the exciter magnet;

FIG. 24 is a perspective view of a second preferred embodiment of a rotary magnetic encoder assembly constructed in accordance with the present invention where the encoder shaft includes a resilient biasing element that carries a drive coupling that is a drive magnet;

FIG. 25 is a cross-sectional view of the second preferred rotary magnetic encoder assembly embodiment of FIG. 24;

FIG. 26 is an exploded cross-sectional view of the second preferred rotary magnetic encoder assembly embodiment of FIG. 24;

FIG. 27 is an exploded view of a third preferred rotary magnetic encoder assembly embodiment;

FIG. 28 is a cross-sectional view of a rotary magnetic encoder chip equipped with an integral exciter magnet in its package body;

FIG. 29 is a preferred embodiment of a rotary magnetic encoder assembly embodiment with the rotary magnetic encoder chip of FIG. 28 shown enlarged for clarity;

FIG. 30 is an exploded side elevation view of an exciter magnet module and conventional rotary magnetic encoder chip;

FIG. 31 is an exploded end elevation view of the exciter magnet module and conventional rotary magnetic encoder chip of FIG. 30;

FIG. 32 is a side elevation view of the module shown in FIGS. 30 and 31 attached to the conventional rotary magnetic encoder chip; and FIG. 33 is an end elevation view of the module shown in FIGS. 30 and 31 attached to the conventional rotary magnetic encoder chip.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Introduction

An example of a prior art rotary magnetic encoder 30 is shown in FIGS. 1-5. With specific reference to FIGS. 1-3, the encoder 30 has a substantially rigid housing 32 in which is fixed a bearing arrangement 34 that cooperates with a rotary encoder shaft 36 having a sensor exciter magnet 38 fixed in its free end that overlies a magnetic field sensor region 40 of a magnetic rotary encoder integrated circuit chip 42 attached to a circuit board 44 that is fixed to the housing 32. The circuit board 44 has onboard electronics 46 used to process data from the encoder chip 42 and output data or a signal that is representative of or which relates to rotary movement of the shaft 36 via a connector 47. Shaft 36 can be directly connected to that which is being measured or can be connected by a coupling (not shown) or the like to another shaft or other component that is being rotated or otherwise displaced in a manner lending itself to rotary encoder measurement.

The bearing arrangement 34 is held in place against the encoder housing 32 by a locking ring 48 and includes at least one shaft bearing 50, 52 to help ensure the shaft 36 runs axially true for preventing the magnet 38 from wobbling during shaft rotation. The bearing arrangement 34 also includes means to axially lock the shaft 36, such as by use of a ring 54 or the like that seats in a groove 56 (FIG. 2) formed in the shaft 36, so that the gap, Z (FIG. 4), between the end of the exciter magnet 38 and the outer surface 58 of the encoder chip 42 is maintained within a desired tolerance.

The exciter magnet 38 is a bi-polar disk-shaped permanent magnet that is fixed in a pocket 60 in the free end of the encoder shaft 36. The magnet 38 is bisected with one magnet half defining a North pole 62 and the other magnet half defining a South pole 64. The magnet 38 is relatively small, typically having a diameter of about 6 millimeters and a height or thickness of no more than about 2.5 millimeters, but is powerful as it is typically a rare earth Alnico (AlNiCo), samarium cobalt (SmCo5), or neodymium (NdFeB) magnet.

The location of the exciter magnet 38 must be precisely located relative to the sensor region 40 of the encoder chip 42. The magnet 38 must be centered such that its axial center 61 is substantially coaxial with an axis of rotation 66 of the shaft and a center 68 of the sensor region 40 within an accepted minimal tolerance. This is to ensure that an array of Hall sensors, $H_0$-$H_7$, arranged generally as depicted in FIG. 5 in four quadrants, $Q_0$-$Q_3$, of the sensor region 40 of the encoder chip 42 experience a relatively uniform magnetic field distribution from whichever pole of the magnet 38 is closest. Such an encoder chip 42 can have a greater or lesser number of Hall sensors. For example, such an encoder chip 42 can be equipped with as few as four Hall sensors.

A couple of preferred examples of a commercially available contactless rotary magnetic encoder chip having such a construction include an AS5040 and AS5046 rotary magnetic angle encoder integrated circuit chip made by Austria Microsystems of Tobelbaderstrasse 30, Schloss Premstaetten, Unterpremstaetten, Austria. The AS5046 is a 16 pin integrated circuit (IC) that includes an onboard array of Hall sensors, $H_0$-$H_7$, onboard amplifier therefor, onboard digital signal processor, onboard automatic gain control, onboard range pre-select, an onboard OTP register, an onboard digital to analog converter, and an onboard interface. Other examples of commonly used magnetic encoder chips of similar construction include an AS5040 10-bit programmable magnetic rotary encoder IC chip, an iC-MA Angular Hall Encoder chip made by iC Hause Integrated Circuits of Am Kuemmerling 18, 55294 Bodenheim, Germany, as well as an AM256 rotary magnetic encoder IC chip by Renishaw plc of New Mills, Wotton-under-Edge, Gloucestershire, United Kingdom.

As a result, the distance, Z, of the exciter magnet 38 from the outer surface 58 of the encoder chip 42 (and hence the distance of the magnet 38 from the array of Hall sensors, $H_0$-$H_7$), must be within an acceptable distance range depending on the field strength of the magnet 38 and the center of the magnet 38 (and rotational axis 66 of shaft 36) must be within an acceptable range of the center point 68 of the sensor region 40 of the encoder chip 42 or errors will undesirably result. For example, such errors can be in the form of increased signal noise in the output signal. Where a pair of offset sine or square waves is outputted by the encoder chip 42, such errors can be in the form of an erroneous increase or decrease in the offset. Where this offset is determinative of the rotational angle of the exciter magnet 38, any such error will obviously result in an erroneous rotational angle.

First Preferred Rotary Magnetic Encoder Assembly Embodiment

FIGS. 6-15 illustrate a first preferred embodiment of a misalignment and mislocation tolerant non-contact rotary magnetic encoder assembly 80a' and 80a" constructed in accordance with the present invention. Two similar variants of the encoder assembly 80a' and 80a" are shown in FIG. 6 and FIG. 7 with the variant 80a' shown in FIG. 6 having a single rotary encoder shaft 82a and the variant 80a" having its bearing-less rotary encoder shaft 82b connected by a physical coupling 84, such as a flexible coupling or the like, to another shaft 86 through which rotary motion is communicated to the encoder shaft 82b. To provide a greater amount of tolerance to angular misalignment, radial misalignment, and/or spacing mislocation of the encoder shaft 82a or 82b relative to the encoder chip 42 than conventional prior art rotary magnetic encoders, the encoder shaft 82a or 82b carries a drive coupler arrangement 87a that magnetically couples with a free-wheeling exciter magnet 38 that is held captive within the encoder assembly 80a' or 80a" so as to ensure consistent, suitable spacing and accurate radial location of the exciter magnet 38 relative to the sensor region 40 (FIG. 8) of the encoder chip 42 during operation of the rotary magnetic encoder assembly 80a' or 80a". In the preferred embodiment shown in FIGS. 6 and 7, the drive coupler arrangement 87a is a drive magnet 88 that magnetically couples with the exciter magnet 38 for rotation in unison therewith once complete coupling is achieved. As a result, at least one preferred embodiment of a rotary magnetic encoder assembly, e.g., encoder assembly 80a' and 80a", constructed in accordance with the present invention is less expensive to construct because does not have any shaft bearings as none are required.

Rotary magnetic encoder assemblies 80a' and 80a" each have a "puck" shaped encoder body 90 that carries the exciter magnet 38 and a circuit board 92 that includes onboard electronics 94 and encoder chip 42. As is best shown in FIGS. 8-11, the encoder body 90 has a first generally cylindrical recess 96 of generally counterbore construction having an annular flat mounting surface 98 about its outer periphery to which the circuit board 92 is mounted using fasteners 100. If desired, the mounting surface 98 can have bores 106 in it configured to facilitate fastener engagement and be bounded by an annular axially-extending sidewall 108 in which additional fastener-receiving bores 110 are formed. The encoder body 90 has a second recess 102 that is a clearance recess in which the encoder chip 42 is disposed when the circuit board 92 is mounted to the encoder body 90. The second recess is also annular or generally cylindrical but can be formed having a different shape, such as one which is complementary to the shape of the encoder chip 42. The encoder body 90 also has a generally cylindrical magnet-holding pocket 104 formed in it that overlies the sensor region 40 (FIG. 8) of the encoder chip 42 when the circuit board 92 is mounted to the encoder body 90. As is best shown in FIGS. 8 and 10, the magnet pocket 104 is defined by a mouth 111, an endless circular sidewall 112 and an end-wall 114.

If desired, there can be an adhesive or protective coating, cover or the like (not shown in FIGS. 6-15) that overlies the encoder chip 42 between the chip 42 and exciter magnet 38. There also can be a layer of low friction material (also not shown in FIGS. 6-15) disposed between the magnet 38 and chip 42 to minimize the friction the exciter magnet 38 experiences when being rotated relative to the encoder body 90 and relative to the encoder chip 42 by the drive magnet 88 during encoder operation. Where an adhesive or protective coating or cover is used, the low friction layer preferably is located between the adhesive or protective coating or cover and the magnet 38.

As is best shown in FIG. 11, the opposite side of the encoder body 90 can be configured with a recessed generally flat or planar end-wall 116 bounded by an axially-extending sidewall 118. If desired, the sidewall 118 can include a plurality of circumferentially spaced apart fastener-receiving bores 120. As is shown in FIGS. 6 and 7, at least part of this end-wall 116 overlies and/or defines part of the magnet pocket 104.

With reference to FIG. 6, encoder assembly 80a' can include an outer housing 122 (shown in phantom in FIG. 6), such as in the case where either shielding is desired or where additional protection and/or ruggedness is desired. Where the outer housing 122 overlies any portion of encoder body end-wall 116, it can be configured with a bore 124 through which encoder shaft 82a can extend. Depending on requirements, where an outer housing is employed, such an outer housing can be made of metal, such as anodized aluminum, non-magnetic stainless steel, or the like, but can also be constructed of plastic or another synthetic or non-metallic material. Outer housing 122 can be attached to the encoder body 90 by a plurality of fasteners 126 and can be equipped with mounting bores (not shown) that can be threaded for facilitating mounting the encoder assembly 80a' to something else, such as an equipment frame, etc. If desired, where an outer housing is employed, it can have a different shape or configuration than that depicted in FIG. 6. For example, such a housing can be constructed to cover, enclose or otherwise overlie part of or all of the circuit board 92. It also should be noted that use of a housing is not limited for use with only the encoder assembly 80a' shown in FIG. 6, but can be used with other encoder assemblies constructed in accordance with the present invention. Finally, although the magnet pocket 104 is formed in the encoder body 90, it can be formed as part of the housing 122 or as part of some other component otherwise attached to the housing 122, such as where an encoder assembly lacks structure that corresponds to encoder body 90.

The circuit board 92 is attached to the encoder body 90 using fasteners 100. Circuit board 92 can be the same as or similar to previously-discussed circuit board 44 used in the conventional prior art rotary magnetic encoder 30 shown in FIGS. 1-4. Like circuit board 44, circuit board 92 includes onboard electronics 94 used to process data and/or signals from the encoder chip 42 to produce an encoder output that is communicated via a cable (not shown) attached to a connector 128, such as a multiple pin Molex-type socket or the like, to an external device, such as a computer, controller or another type of processor (not shown), which uses encoder output in accordance with the application for which the encoder assembly 80a' or 80a" is being used. For example, where used in determining log cut length for a tree feller, tree harvester, or the like, encoder output from connector 128 is communicated to a controller (not shown) that makes a cut length determination or estimation using the encoder output.

Where an electrical power source is not provided onboard the encoder assembly 80a' or 80a", the connector 128 can also include power supply inputs, such as from an external electrical power source, for communicating electrical power to the encoder chip 42 as well as the other onboard electronics 94. Although a cable connector 128 is shown in FIGS. 6 and 7, the present invention contemplates that other types of connectors, sockets, links and the like, both of hardwire and wireless construction, can be used to communicate encoder output. In addition, such communication can be unidirectional or bi-directional.

The circuit board 92 is fixed to the encoder body 90 in a manner that locates the encoder chip 42 over the magnet pocket 104 capturing the exciter magnet 38 in the pocket 104. The encoder chip 42 is precisely located on the circuit board 92 and the circuit board 92 is precisely located relative to the encoder body 90 when fixed to the body 90. As a result, the magnet pocket 104 is precisely located relative to the sensor region 40 of the encoder chip 42 such that an exciter magnet 38 received in the pocket 104 is also precisely located relative to the sensor region 40 of the encoder chip 42. More specifically, the center 61 of the exciter magnet 38 is maintained substantially coaxial with the center 68 of the sensor region 40 of the encoder chip 42 by capturing the magnet 38 in the pocket 104. Precisely locating the exciter magnet 38 in this manner advantageously ensures that the sensor region 40 of the encoder chip 42 experiences a substantially uniform magnetic field distribution from the exciter magnet 38 at all times during encoder operation. This advantageously minimizes, if not prevents, encoder chip errors relating to mislocation and angular misalignment that occurred in the past with conventional prior art magnetic encoders where the exciter magnet was mounted to the rotary encoder shaft, i.e. shaft 36 (FIGS. 1-4).

During operation of a rotary magnetic encoder constructed in accordance with the present invention, the exciter magnet 38 is driven by the drive magnet 88, which is carried by encoder shaft 82a or 82b and located close enough to the exciter magnet 38 to magnetically couple with the magnet 38 even though the two magnets 38, 88 do not directly contact one another. The drive magnet 88 can be disk-shaped the same as or similar to that of the exciter magnet 38. The drive magnet 88 has at least two poles 130, 132 with the line of intersection of the poles 130, 132 bisecting the magnet 88 as shown in FIG. 8. In the preferred embodiment shown in FIGS. 6-8, the drive magnet 88 is disk-shaped, received in a pocket 134 formed in the axial free end of the encoder shaft 82a or 82b, and has a center 136 that is generally coaxial with an axis 138 of rotation of the encoder shaft 82a or 82b. In the preferred embodiment shown in FIGS. 6-8, the drive magnet 88 is fixed to the encoder shaft 82a or 82b so the magnet 88 rotates in unison with the shaft 82a or 82b. Such a magnet 88 can be fixed by being press fit into the pocket 134 or adhesively attached to the encoder shaft 82a or 82b. Other means of attachment can be used including means of attachment, e.g., adhesive attachment, where pocket 134 is not required.

The magnet pocket 104 preferably is of low-friction construction to allow the exciter magnet 38 to rotate substantially in unison with the drive magnet 88 when the drive magnet 88 is located in close enough proximity where magnetic coupling takes place. To achieve a suitably low-friction pocket construction, at least the endless pocket sidewall 112 and end-wall 114 are constructed of a material having a low enough static coefficient of friction that the exciter magnet 38 is urged into rotation as the drive magnet 88 is rotated by the encoder shaft 82a or 82b. Such a material has a low enough dynamic coefficient of friction that such coupling between the magnets 38, 88 due to encoder shaft rotation results in the exciter magnet 38 rotating substantially in unison with the drive magnet 88. In addition, the pocket sidewall 112 and end-wall 114 are suitably smooth to reduce friction during exciter magnet rotation. To facilitate magnetic coupling of the drive magnet 88 with the exciter magnet 38, the material of the pocket end-wall 114 is made of a material that also has a sufficiently low magnetic permeability that flux lines of the magnetic fields of the magnets 38, 88 extend through the encoder body material in the region of the pocket end-wall 114 of sufficient strength and/or density so that the magnets 38, 88 efficiently couple in a manner where exciter magnet 38 can eventually if not nearly immediate rotate in unison with the drive magnet 88 in response to rotation of the encoder shaft 82a or 82b. In a preferred embodiment, the pocket sidewall and end-wall material along with the magnets 38 and 88, including their field strengths, are selected so that there is a desirably low coefficient of friction, a suitably low magnetic permeability and suitably high magnetic field strength so that the exciter magnet 38 can achieve coupling with the drive magnet 88 very quickly after the drive magnet 88 begins to rotate such that the exciter magnet 38 rotates in unison with the drive magnet 88 at the same rotational speed as the encoder shaft 82a or 82b during operation. As a result of such drive magnet—driven exciter magnet coupling, a greater degree of angular misalignment of the encoder shaft relative to the center of the exciter magnet and the center of the sensor region of the encoder chip is tolerable.

In at least one embodiment, at least the material in the region of the pocket end-wall 114 is a non-ferromagnetic material, e.g., DELRIN, having a relative permeability no greater than twice that of a vacuum. Such a low permeability material can have a somewhat higher permeability depending on factors such as magnetic field strength and/or flux density of the magnets 38, 88, the spacing between the magnets 38, 88, maximum encoder shaft rotational speed likely to be encountered, as well as quite possibly other factors.

As is most clearly shown in FIGS. 6 and 7, the encoder chip 42 is positioned so it overlies the mouth 111 of the magnet pocket 104 in a manner that essentially "caps" the pocket thereby capturing the exciter magnet 38 in the pocket 104. This prevents the exciter magnet 38 from being removed or otherwise inadvertently falling out of the pocket 104 unless the circuit board 92 is intentionally disassembled from the encoder body 90. The encoder chip 42 can also be and preferably is constructed of a low friction material as, in a currently preferred embodiment; the chip 42 is of dual-inline package (DIP) construction packaged in a ceramic or plastic material thereby minimizing frictional losses should the exciter magnet 38 come into contact with the outer surface of the package of the chip 42 during magnet rotation. Such low friction pocket and chip construction along with low magnetic permeability in the space between the magnets 38, 88 advantageously helps ensure that coupling between the magnets 38, 88 is maintained even at rotational speeds greater than 1,000 revolutions per minute (rpm) and, in at least some instances, even at rotational speeds greater than about 5,000 rpm.

With reference once again to FIGS. 9-11, the encoder body 90, including the material of the encoder body 90 that defines pocket sidewall 112 and outer encoder body end-wall 116, is made of plastic, such as a thermoplastic like DELRIN, nylon, aluminum, or another suitable material having a magnetic permeability and coefficient of friction that is low enough to permit coupling of the magnets 38, 88 and to maintain that coupling at rotational speeds of greater than 1,000 rpm. In a currently preferred embodiment, the encoder body 90 is made of DELRIN having the magnet pocket 104 formed using a conventional material removal process but which can also be integrally molded into the encoder body 90 if desired. In another preferred embodiment, the encoder body 90 can be made of anodized aluminum with the magnet pocket 104 formed by machining or another material removal process as anodized aluminum possesses both a suitably low magnetic permeability and low coefficient of friction.

FIGS. 12-15 illustrates how the exciter magnet 38 self-locates when the drive magnet 88 attached to the encoder shaft 82a is brought close enough to cause the magnets 38, 88 to couple. FIG. 12 illustrates the exciter magnet 38 abutting against the encoder chip 42, such as what can occur in the absence of any magnetic field of the drive magnet 88 when gravity pulls the exciter magnet 38 on top of the encoder chip 42. FIG. 13 illustrates bringing the encoder shaft 82a toward the encoder body 90 and the exciter magnet 38 causing magnetic field interaction between the drive magnet 88 and exciter magnet 38 that causes the exciter magnet 38 to begin moving toward the pocket end wall 114 and the drive magnet 88. FIG. 14 shows the encoder shaft 82a located close enough to encoder body 90 and exciter magnet 38 causing interaction between the magnetic field of the drive magnet 88 and the magnetic field of the exciter magnet 38 to pull the exciter magnet 38 against the pocket end wall 114 while the magnets 38, 88 also become magnetically coupled. With reference to FIG. 15, the pocket end wall 114 provides an abutment surface for the exciter magnet 38 that also accurately locates the magnet 38 relative to the encoder chip 42 such that the exciter magnet 38 is spaced apart a desired and acceptable distance, Z, such that the sensor region 40 of the encoder chip 42 will experience a substantially uniform magnetic field during encoder operation. Because the pocket sidewall 112 is sized slightly larger than the exciter magnet 38, it prevents the magnet 38 from flipping during this axial location and magnetic coupling process while also radially locating the exciter magnet 38 relative to the sensor region 40 of the encoder chip 42 so that the center 61 of the exciter magnet 38 is substantially coaxial or substantially aligned with the center 68 of the sensor region 40 of the encoder chip 42.

As previously discussed, the exciter magnet 38 can be a rare earth magnet, such as an alnico magnet, a samarium cobalt magnet, or a neodymium magnet having a suitably high magnetic flux density that provides the sensor region 40 of the encoder chip 42 with a substantially uniform magnetic field during encoder operation when maintained captive in the magnet pocket 104 in the encoder body 90. In a preferred embodiment, the exciter magnet 38 is an alnico magnet, a samarium cobalt magnet, or a neodymium magnet specifically designed for use with the particular encoder chip 42 used in the rotary magnetic encoder assembly 80a' or 80a". Such an exciter magnet 38 can have a diameter of about 6 mm and a height or thickness of no more than about 2.5 mm. It is of bipolar construction, being axially bisected in a manner that divides the magnet 38 in half such that one half is a North Pole 62 and the other half is a South Pole 64. Routine testing and experimentation can be used to select an exciter magnet having characteristics differing from that described above but which optimizes its performance with the encoder chip 42 and the drive coupler 87, e.g., drive magnet 88, employed.

The drive magnet 88 can also be a rare earth magnet, such as an alnico magnet, a samarium cobalt magnet, or a neodymium magnet. In the preferred embodiment shown in FIGS. 6-8 and 13-15, the drive magnet 88 can be the same as or similar to the exciter magnet 38. For example, in the preferred embodiment shown in FIGS. 6-8 and 13-15, the drive magnet 88 is a disk-shaped rare earth magnet of bipolar construction having one half that is a South pole 130 and another half that is a North pole 132. While the drive magnet 88 is shown in FIGS. 6-8 and 13-15 as being roughly the same size as the exciter magnet 38, the drive magnet 88 can be somewhat larger or slightly smaller than the exciter magnet 38. As with the exciter magnet 38, similar routine testing and experimentation can be employed to select a drive magnet 88 having optimal properties in view of the application, distance between it and the exciter magnet 38, the magnetic permeability of the material between it and the exciter magnet, etc.

FIGS. 16-20 are schematic diagrams that illustrate operation of a rotary magnetic encoder assembly 80a' or 80a" constructed in accordance with the present invention and which also highlight more clearly its ability to tolerate angular misalignment and mislocation of the drive magnet 88 relative to the exciter magnet 38 while maintaining magnetic coupling therebetween.

FIG. 16 illustrates magnetic coupling of a rotary magnetic encoder assembly constructed in accordance with the present invention where the exciter magnet 38 is accurately radially aligned with the sensor region 40 of the encoder chip 42 (not shown in FIG. 16) such that its center 61 about which it rotates when magnetically coupled to the drive magnet 88 is substantially coaxial and aligned with the center 68 of the encoder chip sensor region 40. As is also shown in FIG. 16, the exciter magnet 38 is optimally spaced apart a distance, Z, from the encoder chip sensor region 40 thereby ensuring that the sensor region 40 experiences a substantially uniform magnetic field from the exciter magnet 38. In this example, the drive magnet 88 is fixed to the encoder shaft 82a such that it rotates in unison therewith with the drive magnet 88 having its center 136 substantially coaxial with the encoder shaft axis of rotation and generally aligned with the center 61 of the exciter magnet 38 and the center 68 of the encoder chip sensor region 40. In addition, the drive magnet 88 is optimally spaced a distance, $D_1$, from the exciter magnet 38 ensuring good magnetic coupling between magnets 38 and 88.

During operation, rotation of the encoder shaft 82a rotates the drive magnet 88 with the drive magnet 88 magnetically coupling with the exciter magnet 38 when the North pole of the drive magnet 88 overlies or aligns with the South pole of the exciter magnet 38 in the South pole of the drive magnet 88 overlies or aligns with the North pole of the exciter magnet 38. When this occurs, the drive magnet 88 causes the exciter magnet 38 to rotate in unison with the encoder shaft 82a thereby causing its magnetic fields to interact with the Hall sensors of the encoder chip sensor region 40 in a manner that accurately outputs a signal indicative of (1) encoder shaft angle, and/or (2) the rotational speed of the encoder shaft 82a, such as in revolutions per minute, radians per second, or the like.

FIG. 17 illustrates that the radial location of the exciter magnet 38 along with its ideal spacing, Z, from the encoder chip sensor region 40 always remains optimum despite the fact that its distance, $D_2$, from the drive magnet 88 is greater than $D_1$ and greater than Z. This example demonstrates an advantage of the present rotary magnetic encoder assembly 80a' or 80a" in that it is significantly more tolerant to spacing changes than the aforementioned conventional prior art rotary magnetic encoders. Depending on magnetic field strength of the drive magnet 88 as well as that of the exciter magnet 38, the spacing, D, between the magnets 38, 88 can vary as much as 50% or about 35 millimeters while maintaining sufficient magnetic coupling that the exciter magnet 38 will rotate in unison with the drive magnet 88 and hence with the encoder shaft 82a.

FIG. 18 illustrates that the angular alignment of the drive magnet 88 relative to the exciter magnet 38 can be off such that there is angular misalignment therebetween. As is shown in FIG. 18, the axis of rotation of the encoder shaft 82a passes through the center 136 of the drive magnet 88 as well as through the center 61 of the exciter magnet 38 but diverges from an axis of alignment between the center 61 of the exciter magnet 38 and the center 68 of the encoder chip sensor region 40 by an angle, $\alpha_1$. Even though there is angular misalignment, coupling between the drive magnet 88 and the exciter magnet 38 is maintained such that the exciter magnet 38 rotates substantially in unison with the drive magnet 88 and the encoder shaft 82a. In a preferred embodiment, a rotary magnetic encoder assembly 80a' or 80a" constructed in accordance with the present invention can tolerate an angular misalignment, $\alpha$, of as much as 30° so long as the distance, D, between the magnets 38, 88 is close enough to achieve magnetic coupling.

FIG. 19 also illustrates angular misalignment tolerance but the ability to adequately maintain magnetic coupling decreases as the distance, $D_2$, between the magnets 38, 88 increases. In this case, $D_2$, is greater than $D_1$ and Z and $\alpha_2$ is less than $\alpha_1$. FIG. 20 illustrates the case where the drive magnet 88 is both radially offset and angularly misaligned such that the axis of rotation of the encoder shaft 82a passes through the center 136 of the drive magnet 88 but does not pass through the center 61 of the exciter magnet 38 with the angle, $\alpha_3$, between the axis of encoder shaft rotation and an axis extending between the center 61 of the exciter magnet 38 in the center 68 of the encoder chip sensor region 40 being as much as 30° so long as the distance, D, between the magnets 38, 88 is close enough to achieve magnetic coupling.

FIG. 21 illustrates another preferred drive coupling embodiment where the drive coupler 87b includes a pair of drive magnets 88a and 88b mounted to a cylindrical encoder shaft 82c that cooperate with the sensor exciter magnet 38 to magnetically couple with the exciter magnet 38. The magnets 88a and 88b are disposed opposite one another such that they are approximately 180° apart with one of the magnets 88a having its North pole facing axially outwardly generally toward the encoder assembly 80a' and the other one of its magnets 88b having its South pole facing axially outwardly generally toward the encoder assembly 80a'. When coupling occurs, magnetic flux lines extend between the North pole of magnet 88a and the South pole 64 of the exciter magnet 38 and magnetic flux lines extend between the South pole of magnet 88b and the North pole 62 of the exciter magnet 38. In another preferred embodiment, the magnets instead can be radially disposed with one of the magnets 88a' (shown in phantom in FIG. 21) having its North pole facing generally radially inwardly toward the South pole of the other one of the magnets 88b'.

While magnets 88a and 88b are shown mounted in an axially outer surface of a generally cylindrical encoder shaft 82c, the encoder shaft can be a rod that is attached to an annular ring or collar that carries magnets 88a and 88b. Depending on the strength of magnets 88a and 88b, the diameter of such a shaft, ring or collar carrying magnets 88a and 88b can be made larger than shown in FIG. 21. For example, if desired, the diameter of such a shaft, ring or collar can be made large enough such that the inner diameter is larger than the outer diameter of the encoder body 90 enabling at least a portion of the encoder body 90 to be received within the shaft, ring or collar. While permanent magnets 88a and 88b are shown in FIG. 21, it should be noted that they could instead be electromagnets or an electromagnet arrangement carried by the encoder shaft 82c that causes regions corresponding to 88a and 88b to respectively produce North and South pole fields.

FIG. 22 illustrates another embodiment of a drive coupler 87c that is similar to the drive coupler 87b of FIG. 21 but which utilizes a plurality of pairs, i.e., at least three, of drive magnets. For example, there are eight drive magnets 88a-h disposed about the circumference of the axial surface of encoder shaft 82c. Preferably, there are at least a plurality of North pole facing magnets, e.g., 88a, 88c, 88d, and 88e, and at least a plurality of South pole facing magnets, e.g., 88b, 88f, 88g, and 88h, that couple in a manner similar to that discussed above with regard to FIG. 21. Of course, if desired, one or more of these drive magnets can be radially disposed.

FIG. 23 illustrates still another embodiment of a drive coupler 87d where encoder shaft 82d is made of a ferromagnetic or paramagnetic material or ferromagnetic/paramagnetic material is disposed at the end of the shaft 82d with the end of the shaft 82d located in such close proximity to the exciter magnet 38 that the magnetic attraction of the ferromagnetic/paramagnetic material to the exciter magnet 38 effectively couples the magnet to the shaft causing the exciter magnet 38 to rotate in unison with the encoder shaft 82d when this occurs. If desired, the shaft 82d can be of permanent or electromagnet construction having just a single pole at its free end 89 that is disposed adjacent the exciter magnet 38 such that coupling of flux lines between the pole and the opposite pole of the exciter magnet 38 achieves sufficient magnet coupling for rotation of the exciter magnet 38 in unison with the shaft 82d.

Second Preferred Rotary Magnetic Encoder Assembly Embodiment

FIGS. 24-26 illustrate a second preferred embodiment of a rotary magnetic encoder assembly 80b constructed in accordance with the present invention. The encoder assembly 80b includes an outer tubular shell 140 that can be made of metal, such as aluminum or the like, which houses an encoder circuit assembly 142 that includes a circuit board, 143, interface electronics 94, a connector 128 and magnetic rotary encoder integrated circuit chip 42, an encoder body or base 144 and an exciter magnet holder 146 that holds the exciter magnet 38 in a manner that precisely locates it relative to the encoder chip 42. There can be an adhesive cover 148 disposed between the encoder chip 42 and exciter magnet 38 as best shown in FIG. 26. In addition, there also can be a low friction cap 150 that is a relatively thin layer of a relatively low friction material such as TEFLON, nylon, or another relatively low friction material that facilitates free spinning movement of the exciter magnet 38 in the magnet holder 146 when coupled with the encoder shaft 82e. In the preferred embodiment shown in FIGS. 24-26, the rotary magnetic encoder assembly 80b has an adhesive cover 148 that overlies the encoder chip 42 and a low friction material layer 150 disposed between the encoder chip 42 and the exciter magnet 38.

The magnet holder 146 is an insert that is received in a recess 152 formed in the encoder base 144 such that when the encoder assembly 80b is assembled, the magnet holder 146 is disposed in engagement with the encoder base 144 with one end of the holder 146 is disposed adjacent the encoder chip 42. The recess 152 communicates with an opening 154 formed in the encoder base 114 through which part of the encoder shaft 82e extends during encoder operation. The magnet holder 146 has a magnet-holding and locating pocket 156 formed in one end and a low friction coupling guide bore 158 formed in its other end with an end wall 160 disposed therebetween. As is shown in FIG. 25, a portion of the encoder shaft 82e that carries the drive magnet 88 is received in the low friction coupling guide bore 158. The magnet holder 146 preferably is made of a material having a relatively low magnetic permeability, such as DELRIN or the like, to optimize magnetic coupling between the drive magnet 88 and exciter magnet 38 by minimizing any reduction in magnetic flux density therebetween. When encoder assembly 80b is assembled, the low friction cap 150 overlies the pocket 156 and the exciter magnet 38 as shown in FIG. 25.

The encoder shaft 82e is an elongate biasing element 162 that preferably is a coil spring that holds the drive magnet 88 at its free end with its free end and magnet 88 received in the low friction coupling guide bore 158 during encoder operation. It includes a coupling collar 164 at its opposite end that mates with a rotating element 166 (shown in phantom in FIG. 25) causing the encoder shaft 82e to rotate in unison with the rotating element 166 during operation. Use of biasing element 162 advantageously accommodates a great deal of axial, radial and angular play making use of this type of encoder shaft 82e well suited for applications where the rotating element 166 may move axially toward or away from the encoder assembly 80b, radially relative to the encoder assembly 80b, as well as angularly relative to the encoder assembly 80b (as well as a combination of all three) during operation. The length of the biasing element 162 can be and preferably is selected so that it is captured in compression during operation in the low friction coupling guide bore 158 between the magnet holder 146 and the rotating element 166 based on the distance therebetween.

Third Preferred Rotary Magnetic Encoder Assembly Embodiment

FIG. 27 illustrates a third preferred embodiment of a rotary magnetic encoder assembly 80c that includes an elongate outer tubular shell 168 which houses an elongate carriage 170 that holds the interface electronics, the connector and encoder chip 42 that is capped by a magnet holding encoder body 172 made of a low friction material that also has a low magnetic permeability. The magnet holder 172 has a pocket 174 in which the exciter magnet 38 is received. When the magnet holder 172 is disposed in the shell 168, it ensures accurate positioning of the exciter magnet 38 relative to the encoder chip 42. If desired, a low friction layer 176 and adhesive or protective layer 178 can be disposed between the exciter magnet 38 and the encoder chip 42.

The encoder shaft 82f can be constructed the same as or similar to any of the encoder shaft constructions discussed previously herein. In the preferred embodiment shown in FIG. 27, the encoder shaft 82f includes a rod 180 of non-magnetic construction that holds the drive magnet 88 in its free end. Where made of a non-magnetic metal, it can be made of a non-magnetic stainless steel, bronze or the like, with the magnet 88 press fit into a pocket formed in the free end of the rod 180. Where the rod is made of a magnetic metal, the magnet 88 is magnetically isolated from the rod using a non-magnetic bushing (not shown) that is disposed in the free end of the rod, such as by press-fitting or the like.

Rotary Magnetic Encoder Chip

FIG. 28 illustrates a preferred embodiment of a rotary magnetic encoder chip 182 constructed in accordance with the present invention that has a package body 184 formed with an integral exciter magnet holding pocket 186 in which a rotatable exciter magnet 188 is held captive. The encoder chip package body 184 houses at least a plurality of Hall sensors 190 arranged in a Hall sensor array 192 that also defines an encoder chip sensor region 196 along with additional onboard electronic circuitry, such as onboard analog-to-digital converter circuitry (not shown) as well as digital signal processing circuitry (not shown). Although only two Hall sensors 190 are shown in FIG. 28, rotary magnetic encoder chip 182 preferably has an array of at least four such sensors 190 and can have as many as eight or more sensors arranged in an array the same as or like the arrangement of Hall sensors, $H_0$-$H_7$, shown in FIG. 5 defining a similarly configured sensor region. Extending from the package body 184 are a plurality of pairs of electrically conductive pins 194 that can be soldered to a circuit board or which can be inserted into a socket, such as preferably a DIP integrated circuit socket (not shown) or the like. Thus, a rotary magnetic encoder chip 182 equipped with an integral rotatable exciter magnet 188 constructed in accordance with the present invention can and preferably has a DIP footprint, though its package height might be greater than a standard integrated circuit of DIP construction.

The pocket 186 is annular or disk-shaped and is located relative to the Hall sensors 190 so as to center the exciter magnet 188 over the sensor region and position it above the sensors so they experience a substantially uniform magnetic field from the exciter magnet when it is rotated, such as by a drive magnet, e.g., drive magnet 88, during operation. Exciter magnet 188 is annular or disk shaped and can be a rare earth magnet, such as an alnico, samarium cobalt or neodymium magnet.

The encoder chip package body 184 can be molded, cast, pressed, or otherwise formed of a relatively low friction material that also has a low magnetic permeability to enable the exciter magnet 188 to rotate freely in the pocket 186 when coupling with an external magnetic field or other drive coupling occurs. Such materials include at least some ceramic materials as well as some plastics, including DELRIN and the like. If desired, the pocket 186 can be lined with a low friction material, such as TEFLON or the like, that reduces friction to facilitate exciter magnet coupling as well as to increase ease of exciter magnet rotation once coupling has been achieved. If desired, the package body 184 can be of layered construction (not shown) where at least a portion of the package body 184 located above the exciter magnet 188 is made of a material having low magnetic permeability.

In one preferred embodiment, the pocket 186 is integrally formed in the package body 184 of the encoder chip 182 during manufacture of the encoder chip 182 with the exciter magnet 188 disposed in the pocket 186 as part of the encoder chip manufacturing process. This is done at the encoder chip manufacturing or fabrication plant.

In another preferred embodiment, a layer is molded onto the package body of a conventional rotary magnetic encoder chip, e.g. encoder chip 42 such that the pocket 186 is integrally formed in the layer molded onto the package body. Preferably, the exciter magnet 188 is positioned within the pocket 186 before or at the time the pocket 186 is formed and/or when the layer is molded. If desired, this can be done during encoder chip manufacture or after encoder chip manufacture, including at a site remote from the encoder chip manufacturing or fabrication plant.

FIG. 29 illustrates use of the rotary magnetic encoder chip 182 with an encoder assembly 80d constructed similar to the encoder assembly 80a' shown in FIG. 6. Encoder ship 182 is attached to circuit board 92 and located so its exciter magnet 188 is adjacent to and generally aligned with drive magnet 88 of encoder shaft 82a of drive coupler 87 so that the exciter magnet 188 couples with drive magnet 88 during encoder shaft rotation for rotation at the same rotational speed as the shaft 82a. Operation is same or similar to that of encoder assembly 80a'.

Rotary Magnetic Encoder Chip Exciter Magnet Module

FIGS. 31-33 illustrate the construction, use and operation of an exciter magnet module 200 that is mountable to a rotary magnetic encoder chip of conventional construction, such as encoder chip 42. Such a module 200 can be releasably mountable, such as by being of clip-on construction, but can also be adhesively attached if desired. Module 200 has a body 202 made of a material having a suitably low magnetic permeability in which an exciter magnet holding pocket 204 of annular construction is formed that holds captive a rotatable disk-shaped exciter magnet 206.

In one preferred embodiment, the body 202 of the module 200 is made of DELRIN but can be made of another material having suitably low magnetic permeability. DELRIN is an example of a preferred exciter magnet module body material because it also possesses low friction such that it facilitates efficient coupling of the exciter magnet 206 with an external drive coupler, e.g., drive magnet 88 or the like, and advantageously enables such coupling to be maintained even at relatively high encoder shaft rotational speeds.

To facilitate accurate location of the module 200 on the chip 42 such that the exciter magnet 206 overlies the Hall sensors, H, of the sensor region 40 of the chip, there is at least a plurality of pairs of side locator tabs 208 and at least a plurality of end locator tabs 210 that respectively engage the sides and ends of a DIP package of encoder chip 42. Tabs 208 and 210 can be configured to relatively tightly frictionally engage the package body of the encoder chip 42 in a manner that enables the module 200 to be "clipped" onto the encoder chip 42. If desired, even where the locator tabs 208 and 210 frictionally engage the encoder chip 42, an adhesive can be applied to either the encoder chip or the module 200 to adhesively fix the module 200 to the chip 42. For example, adhesive, such as an epoxy or the like, can be applied in the space between the chip 42 and module 200 designated by reference numeral 212 in FIGS. 32 and 33.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

It is claimed:

1. A rotary magnetic encoder assembly comprising:
(a) a magnetic field sensor arrangement;
(b) a rotatable magnet disposed adjacent the magnetic field sensor arrangement and having a magnetic field that is sensible by the magnetic field sensor arrangement; and
(c) a rotary encoder shaft that causes rotation of the rotatable magnet without contacting the rotatable magnet; and
wherein the rotary encoder shaft causes rotation of the rotatable magnet by interaction with a magnetic field of the rotatable magnet.

2. The rotary magnetic encoder assembly of claim 1 wherein the rotary encoder shaft is spaced from the rotatable magnet.

3. The rotary magnetic encoder assembly of claim 2 wherein the rotary encoder shaft comprises a drive coupler that provides contactless coupling with the rotatable magnet causing the rotatable magnet to rotate when the rotary encoder shaft rotates.

4. The rotary magnetic encoder assembly of claim 3 wherein the drive coupler comprises a drive magnet spaced close enough to the rotatable magnet that magnetic coupling therebetween is achieved.

5. The rotary magnetic encoder assembly of claim 4 wherein the drive magnet is located at or adjacent a free end of the encoder shaft.

6. The rotary magnetic encoder assembly of claim 1 further comprising an encoder housing or encoder body carrying the magnetic field sensor arrangement and wherein no bearing of the rotary magnetic encoder assembly rotatively supports the encoder shaft.

7. The rotary magnetic encoder assembly of claim 6 wherein there is no bearing mounted to, attached to or otherwise carried by the encoder housing or the encoder body that rotatively supports the encoder shaft.

8. The rotary magnetic encoder assembly of claim 1 further comprising an encoder housing or encoder body and wherein the encoder shaft rotates relative to the encoder housing or encoder body without being rotatively supported thereby.

9. The rotary magnetic encoder assembly of claim 1 further comprising a magnet retainer that locates the rotatable magnet relative to the magnetic field sensor arrangement.

10. The rotary magnetic encoder assembly of claim 9 wherein the magnet retainer locates the rotatable magnet axially and radially relative to the magnetic field sensor arrangement.

11. A rotary magnetic encoder assembly comprising:
(a) a magnetic field sensor arrangement;
(b) a rotatable magnet disposed adjacent the magnetic field sensor arrangement and having a magnetic field that is sensible by the magnetic field sensor arrangement;
(c) a rotary encoder shaft that rotates the rotatable magnet without contacting the rotatable magnet; and
(d) a magnet retainer comprising a magnet-holding pocket holding the rotatable magnet whose location is fixed relative to the magnetic field sensor arrangement axially and radially locating the rotatable magnet relative to the magnetic sensor arrangement.

12. The rotary magnetic encoder assembly of claim 11 wherein the magnet retainer comprises an encoder body comprised of plastic or aluminum.

13. The rotary magnetic encoder assembly of claim 12 wherein the magnet-holding pocket is formed in the encoder body and the rotatable magnet rotates within the magnet-holding pocket relative to the encoder body and magnetic sensor arrangement when rotated by the rotary encoder shaft.

14. The rotary magnetic encoder assembly of claim 11 further comprising at least one of an encoder body and encoder housing and wherein the magnet retainer is carried by one of the encoder body and encoder housing.

15. The rotary magnetic encoder assembly of claim 11 wherein the magnetic field sensor arrangement comprises an integrated circuit and the magnet retainer comprises a module mounted to the integrated circuit.

16. The rotary magnetic encoder assembly of claim 15 wherein the magnetic field sensor arrangement comprises at least a plurality of pairs of Hall sensors disposed onboard the integrated circuit.

17. The rotary magnetic encoder assembly of claim 15 wherein the integrated circuit comprises four quadrants each having a plurality of spaced apart magnetic field sensors defining a magnetic field sensor region having a center and wherein the magnet-holding pocket in the module locates the rotatable magnet adjacent and generally in line with the center of the magnetic field sensor region.

18. The rotary magnetic encoder assembly of claim 11 wherein the magnetic field sensor arrangement comprises an integrated circuit having a package body and the magnet-holding pocket of the magnet retainer is disposed within the integrated circuit package body.

19. The rotary magnetic encoder assembly of claim 18 wherein the magnetic field sensor arrangement comprises a plurality of Hall sensors disposed onboard the integrated circuit arranged in a sensor array that defines a sensor region that underlies the magnet-holding pocket and the rotatable magnet disposed in the magnet-holding pocket.

20. The rotary magnetic encoder assembly of claim 18 wherein the pocket is integrally formed in the package body.

21. A rotary magnetic encoder assembly comprising:
(a) an encoder body or encoder housing;
(b) a rotary magnetic encoder integrated circuit carried by the encoder body or encoder housing, the rotary magnetic encoder integrated circuit comprised of a plurality of Hall sensors that define a magnetic field sensor region;
(c) a magnet retainer carried by the encoder body or encoder housing that is disposed adjacent the magnetic field sensor region of the rotary magnetic encoder integrated circuit;
(d) a rotatable magnet carried by the magnet retainer;
(e) a rotary encoder shaft that effects rotation of the rotatable magnet without contacting the rotatable magnet; and
wherein the magnet retainer locates the rotatable magnet relative to the magnetic field sensor region of the rotary magnetic encoder integrated circuit.

22. The rotary magnetic encoder assembly of claim 21 wherein the magnet retainer comprises a pocket formed in the encoder body in which the rotatable magnet is rotatively disposed and wherein the rotary encoder shaft further comprises a drive magnet disposed at or adjacent its free end that magnetically couples the rotatable magnet such that the rotatable magnet rotates substantially in unison with the drive magnet and encoder shaft.

23. The rotary magnetic encoder assembly of claim 21 wherein the magnet retainer comprises a pocket formed in an insert that engages the encoder body with the rotatable magnet disposed in the pocket.

24. The rotary magnetic encoder assembly of claim 21 wherein the magnet retainer comprises a pocket that accurately locates the rotatable magnet axially and radially relative to magnetic field sensor region of the rotary magnetic encoder integrated circuit.

25. The rotary magnetic encoder assembly of claim 21 wherein the encoder shaft further comprises a permanent magnet that magnetically couples with the rotatable magnet rotating the rotatable magnet substantially in unison with the encoder shaft.

26. A rotary magnetic encoder assembly comprising:
(a) an encoder body or encoder housing;
(b) a rotary magnetic encoder integrated circuit disposed onboard, the rotary magnetic encoder integrated circuit comprised of a plurality of Hall sensors that define a magnetic field sensor region;
(c) a freewheeling rotatable magnet disposed onboard that emits a magnetic field detectable by at least one of the Hall sensors when the rotatable magnet rotates; and
(d) an encoder shaft having a drive magnet that magnetically couples with the freewheeling rotatable magnet during encoder shaft rotation.

27. The rotary magnetic encoder assembly of claim 26 wherein the encoder shaft rotates relative to the encoder housing or encoder body without being rotatively supported thereby.

28. The rotary magnetic encoder assembly of claim 24 wherein the pocket overlies or is disposed in line with the magnetic field sensor region of the rotary magnetic encoder integrated circuit.

29. The rotary magnetic encoder assembly of claim 25 wherein the permanent magnet is fixed to a free end of the encoder shaft facing toward the encoder body.

30. The rotary magnetic encoder assembly of claim 25 wherein encoder shaft comprises a biasing element carrying the permanent magnet.

31. The rotary magnetic encoder assembly of claim 30 wherein biasing element comprises an elongate coil spring.

32. The rotary magnetic encoder assembly of claim 27 wherein (i) the encoder body has a generally cylindrical magnet-holding pocket formed therein receiving the freewheeling rotatable magnet allowing rotation of the freewheeling rotatable magnet relative to the encoder body, and (ii) the rotary magnetic encoder integrated circuit is carried by the encoder body with the magnetic field sensor region of the rotary magnetic encoder integrated circuit disposed generally in line with an axis of rotation of the freewheeling rotatable magnet.

33. The rotary magnetic encoder assembly of claim 32 further comprising a circuit board carrying the rotary magnetic encoder integrated circuit that is attached to the encoder body and wherein the freewheeling rotatable magnet is disposed between the drive magnet of the encoder shaft and the magnetic field sensor region of the rotary magnetic encoder integrated circuit.

34. The rotary magnetic encoder assembly of claim 33 wherein the encoder body is comprised of plastic and wherein the freewheeling rotatable magnet comprises a disk-shaped bi-polar magnet having one magnet half comprising a North pole and the other magnet half comprising a South pole.

35. The rotary magnetic encoder assembly of claim 10 wherein the magnet retainer comprises a plastic or aluminum encoder body having a magnet-holding pocket formed therein holding the rotatable magnet allowing relative rotation between the rotatable magnet and encoder body and wherein the rotatable magnet is disposed between the rotary encoder shaft and the magnetic field sensor arrangement.

36. The rotary magnetic encoder assembly of claim 10 wherein the magnet retainer has a magnet-holding pocket formed therein holding the rotatable magnet allowing relative rotation therebetween, wherein the magnetic field sensor arrangement comprises an integrated circuit, and wherein the rotary encoder shaft comprises a drive magnet disposed at or adjacent a free end of the rotary encoder shaft located adjacent the rotatable magnet that magnetically couples with the rotatable magnet rotating the rotatable magnet during encoder shaft rotation with the rotatable magnet disposed between the adjacent free end of the rotary encoder shaft and the magnetic field sensor arrangement.

37. The rotary magnetic encoder assembly of claim 36 wherein the magnet retainer is comprised of plastic or aluminum, wherein the integrated circuit comprises a plurality of magnetic field sensors, wherein the drive magnet comprises a permanent magnet fixed to the free end of the rotary encoder shaft disposed adjacent the rotatable magnet, and wherein the rotatable magnet is disposed generally in line between the permanent magnet fixed to the free end of the rotary encoder shaft and the integrated circuit.

38. A rotary magnetic encoder assembly comprising:
(a) a magnetic field sensor arrangement;
(b) a disk-shaped rotatable magnet disposed adjacent the magnetic field sensor arrangement and having a magnetic field that is sensible by the magnetic field sensor arrangement;
(c) a rotary encoder shaft that causes rotation of the rotatable magnet without contacting the rotatable magnet; and
(d) an encoder body comprising a generally cylindrical magnet-holding pocket receiving the rotatable magnet that locates the rotatable magnet axially and radially relative to the magnetic field sensor arrangement with the magnet retainer pocket defined by an end wall disposed between the rotary encoder shaft and the rotatable magnet within the magnet-holding pocket.

39. The rotary magnetic encoder assembly of claim 38 wherein the encoder shaft rotates relative to the encoder body without being rotatively supported thereby.

40. The rotary magnetic encoder assembly of claim 38 wherein there is no bearing mounted to, attached to, or otherwise carried by the encoder body that rotatively supports the rotary encoder shaft.

41. A rotary magnetic encoder assembly comprising:
(a) a plastic encoder body having a generally cylindrical magnet-holding pocket formed therein defined by an endless sidewall and end wall;
(b) a magnetic field sensor arrangement carried by the encoder body disposed adjacent the magnet-holding pocket;
(c) a disk-shaped rotatable magnet received in the magnet-holding pocket formed in the encoder body, the rotatable magnet comprising a bi-polar magnet having a magnetic field sensible by the magnetic field sensor arrangement;

(d) a rotary encoder shaft comprising a bi-polar drive magnet magnetically coupling with the rotatable magnet during rotary encoder shaft rotation rotating the rotatable magnet; and wherein (i) the end wall of the magnet holding pocket is disposed between the drive magnet and the rotatable magnet and (ii) the rotatable magnet is disposed generally in line with and between the bi-polar drive magnet and the magnetic field sensor arrangement.

* * * * *